(12) United States Patent
Houle et al.

(10) Patent No.: US 12,462,076 B1
(45) Date of Patent: Nov. 4, 2025

(54) SYSTEMS AND METHODS FOR MODELING DATA IN A CLOUD-BASED ARCHITECTURE

(71) Applicant: Tesser Inc., Cape ELizabeth, ME (US)

(72) Inventors: Chris Houle, Cape Elizabeth, ME (US); Peter Somogyi, Budapest (HU); Gabor Kunszt, Maglod (HU); Els Scholten, Doesburg (NL)

(73) Assignee: Tesser Inc., Cape Elizabeth, ME (US)

( * ) Notice: Subject to any disclaimer, the term of this patent is extended or adjusted under 35 U.S.C. 154(b) by 20 days.

(21) Appl. No.: 17/332,949

(22) Filed: May 27, 2021

Related U.S. Application Data

(60) Provisional application No. 63/032,355, filed on May 29, 2020.

(51) Int. Cl.
| | |
|---|---|
| *G06F 16/00* | (2019.01) |
| *G06F 16/2453* | (2019.01) |
| *G06F 16/248* | (2019.01) |
| *G06F 16/28* | (2019.01) |
| *G06F 30/20* | (2020.01) |
| *G06F 111/02* | (2020.01) |

(52) U.S. Cl.
CPC .......... *G06F 30/20* (2020.01); *G06F 16/2453* (2019.01); *G06F 16/248* (2019.01); *G06F 16/283* (2019.01); *G06F 2111/02* (2020.01)

(58) Field of Classification Search
CPC .... G06F 30/20; G06F 16/2453; G06F 16/248; G06F 16/283; G06F 2111/02
See application file for complete search history.

(56) References Cited

U.S. PATENT DOCUMENTS

| | | | |
|---|---|---|---|
| 5,317,686 A | 5/1994 | Salas et al. | |
| 5,890,151 A * | 3/1999 | Agrawal | G06F 16/24556 |
| | | | 707/999.005 |
| 7,415,473 B2 * | 8/2008 | Zimmerer | G06F 17/10 |
| 7,937,363 B2 * | 5/2011 | Edmunds | G06F 16/2465 |
| | | | 707/625 |

(Continued)

OTHER PUBLICATIONS

"Javelin Plus—Reference Manual," 1993, 418 pgs (presented in two parts).
"Lighthouse Quantrix Marketing," 1995, 2 pgs.
"Microsoft Patent Claim for "Sparklines in the Grid"", Posted on Edward Tufte Forum (2009), Retrieved from https://www.edwardtufte.com/bboard/q-and-a-fetch-msg?msg_id=0003Y1, Printed Sep. 3, 2021.

(Continued)

*Primary Examiner* — Dinku W Gebresenbet
(74) *Attorney, Agent, or Firm* — KPPB LLP

(57) ABSTRACT

Systems and methods for modeling data in accordance with embodiments of the invention are illustrated. One embodiment includes a system for modeling data, the system comprising a data modeling platform application configured to operate on a set of one or more servers to provide a database layer configured to store data for a set of one or more models. The data for each model is based on a multi-dimensional structure and is stored as a one-dimensional vector. The data modeling platform application is further configured to provide a data modeling application layer comprising a multi-dimensional data interface that provides access to the database layer, and a calculation engine configured to perform calculations across multi-dimensional structures for the set of models. The system further includes a client application configured to transmit requests for data for at least one of the set of models to the data modeling platform application.

20 Claims, 18 Drawing Sheets

(56) References Cited

U.S. PATENT DOCUMENTS

| | | | | |
|---|---|---|---|---|
| 8,065,262 | B2* | 11/2011 | Bailey | G06F 16/283 |
| | | | | 707/600 |
| 8,170,984 | B2* | 5/2012 | Bakalash | G06F 16/283 |
| | | | | 707/603 |
| 9,934,295 | B2* | 4/2018 | Sarferaz | G06F 16/28 |
| 10,140,352 | B2* | 11/2018 | Hariharan | G06F 16/283 |
| 10,642,852 | B2* | 5/2020 | Marquardt | G06F 16/24568 |
| 2002/0091707 | A1* | 7/2002 | Keller | G06F 16/30 |
| 2007/0219957 | A1* | 9/2007 | D'Hers | G06F 16/283 |
| 2007/0250295 | A1 | 10/2007 | Murray et al. | |
| 2008/0256099 | A1* | 10/2008 | Chodorov | G06Q 10/10 |
| 2009/0282325 | A1 | 11/2009 | Radakovitz et al. | |
| 2010/0131457 | A1* | 5/2010 | Heimendinger | G06F 16/283 |
| | | | | 707/602 |
| 2011/0219425 | A1* | 9/2011 | Xiong | G06F 21/6218 |
| | | | | 726/28 |
| 2014/0358852 | A1* | 12/2014 | Yurchenko | G06F 17/175 |
| | | | | 707/610 |
| 2015/0088856 | A1* | 3/2015 | Hunter | G06F 16/24544 |
| | | | | 707/718 |
| 2016/0253403 | A1* | 9/2016 | Marin | G06F 16/289 |
| | | | | 707/605 |
| 2016/0371156 | A1* | 12/2016 | Merriman | G06F 16/2308 |
| 2017/0235446 | A1* | 8/2017 | Stolte | G06F 16/252 |
| | | | | 715/854 |
| 2019/0065014 | A1* | 2/2019 | Richter | G06T 11/60 |
| 2020/0026709 | A1* | 1/2020 | Ramaiyer | G06F 16/2455 |
| 2022/0148016 | A1* | 5/2022 | Fang | G06F 16/283 |

OTHER PUBLICATIONS

"Press Release: Lighthouse Design Ships Quantrix 1.0," Retrieved from https://groups.google.com/forum/print/msg/comp.sys.next.announce/GR4gfLqNpR4/bMm4nOpbxmkJ?ctz=5128930_48_52_123900_48_436380, Printed Oct. 2, 2019, 2 pgs.

"Quantrix", Obtained from Infogalactic, Retrieved from https://infogalactic.com/info/Quantrix, Last modified Dec. 16, 2015, Printed Sep. 3, 2021.

"Quantrix", Published by Academic Dictionaries and Encyclopedias (2010), Retrieved from https://en-academic.com/dic.nsf/enwiki/276705, Printed Sep. 3, 2021.

"Quantrix 2.0", Published by Black Hole, Inc. on Jul. 2, 2004, Retrieved from https://www.blackholeinc.com/catalog/software/Software/Spreadsheets/Quantrix.shtml, Printed Sep. 3, 2021.

"Quantrix Profile," 2002, 2 pgs.

"Sparkline", Obtained from Wikipedia from https://en.wikipedia.org/wiki/Sparkline, Last edited Jul. 27, 2021, Printed Sep. 3, 2021.

"The Best of NeXT Computers", Obtained from http://www.kevra.org/TheBestOfNext/ThirdPartyProducts/ThirdPartySoftware/PersonalProductivity/SpreadSheet-Database/Quantrix/Quantrix.html, 2008, Printed Sep. 3, 2021.

"Understanding the Unique Features of Improv," Lotus Improv User Guide (2002), pp. 16-21.

Magid, "Lotus' Improv Easier Than 1-2-3," Los Angeles Times Article Collections, Apr. 15, 1993, 2 pgs.

Quantrix, "Features and Benefits," 1994, 2 pgs.

Quantrix, "Quantrix Modeler User Guide," Version 3.7 (2003-2010), 434 pages (presented in two parts).

Wikipedia, "Lotus Improv," Retrieved from https://en.wikipedia.org/wiki/Lotus_Improv, Last edited Dec. 6, 2017, 10 pgs.

\* cited by examiner

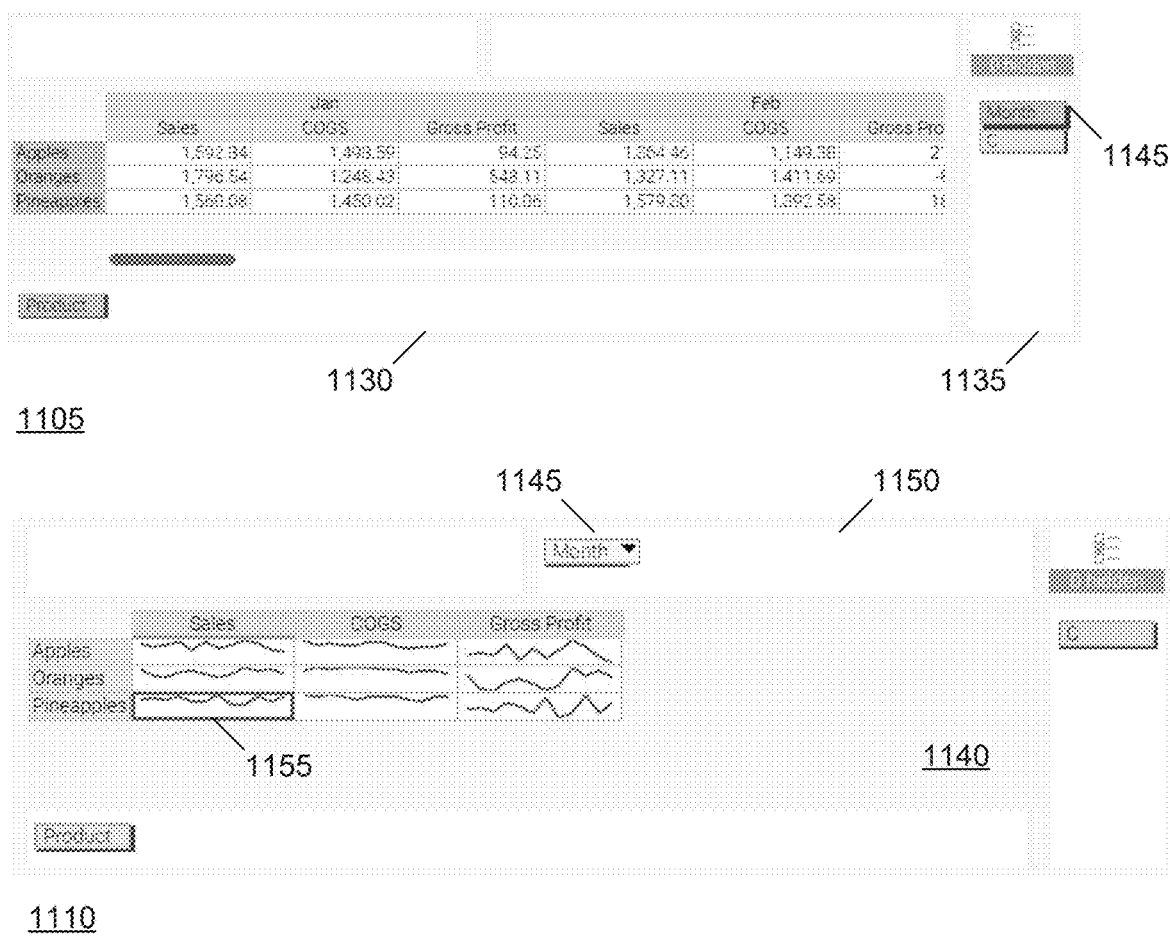
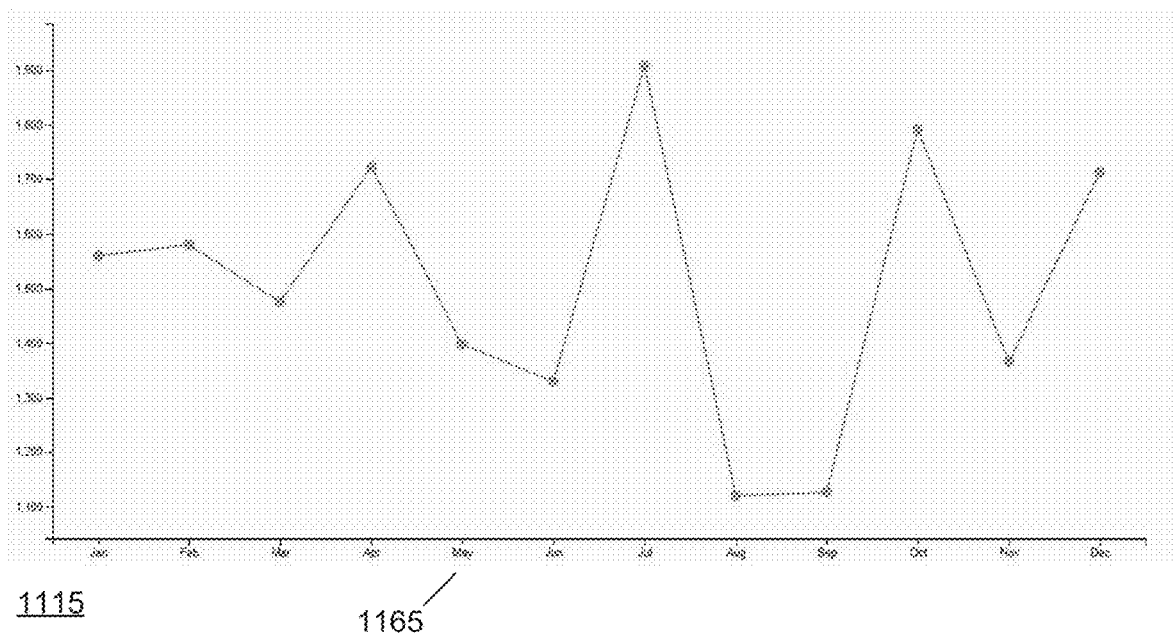
FIG. 11

Orders = COUNTSELECT(samplesuperstoresalesusa::order id, samplesuperstoresalesusa::state = State, samplesuperstoresalesusa::product category = Product Category, samplesuperstoresalesusa::order priority = Order Priority)

1405

```
SELECT count(source."order id"), source."order priority",
source."product category", source."state"
FROM
"samplesuperstoresalesusa" source
WHERE
(
    source."order priority" LIKE 'Not Specified'
    OR source."order priority" LIKE 'Low'
    OR source."order priority" LIKE 'Medium'
    OR source."order priority" LIKE 'High'
    OR source."order priority" LIKE 'Critical'
)
AND (
    source."product category" LIKE 'Office Supplies'
    OR source."product category" LIKE 'Technology'
    OR source."product category" LIKE 'Furniture'
)
AND (
    source."state" LIKE 'Maine'
    OR source."state" LIKE 'Vermont'
    OR source."state" LIKE 'California'
    OR source."state" LIKE 'Total'
)
GROUP BY
    source."order priority",
    source."product category",
    source."state"
```

1410

```
SELECT count(source."order id"), source."order priority",
source."product category", source."state"
FROM
"samplesuperstoresalesusa" source
WHERE
(
    source."order priority" LIKE 'Not Specified'
    OR source."order priority" LIKE 'Low'
    OR source."order priority" LIKE 'Medium'
    OR source."order priority" LIKE 'High'
    OR source."order priority" LIKE 'Critical'
)
AND (
    source."product category" LIKE 'Office Supplies'
    OR source."product category" LIKE 'Furniture'
    OR source."product category" LIKE 'Technology'
)
AND (
    source."state" LIKE 'Oregon'
    OR source."state" LIKE 'New York'
)
GROUP BY
    source."order priority",
    source."product category",
    source."state"
```

Matrix 2

| Country [linkKey] | Currency | Metric | Value |
|---|---|---|---|
| USA | USD | USD FX Rate | ### |
| Canada | CAD | USD FX Rate | ### |
| Mexico | PES | USD FX Rate | ### |

Associated Formula file for matrix 2

USD FX Rate = SELECT(2D Table 1::USD FX Rate, 2D Table 1::Currency = Currency, 2D Table 1::Date = MAX(2D Table 1::Date))

2D Table 1

| Currency | Date | USD FX Rate |
|---|---|---|
| USD | 01/31/2020 | 1 |
| CAD | 01/31/2020 | 0.7 |
| MXN | 01/31/2020 | 0.05 |
| USD | 02/01/2020 | 1 |
| CAD | 02/01/2020 | 0.69 |
| MXN | 02/01/2020 | 0.048 |

Matrix 1

| Country [linkKey] | Product [linkKey] | Metric | Value |
|---|---|---|---|
| USA | Oranges | Units | ### |
| USA | Oranges | Revenue | ### |
| USA | Oranges | Cost | ### |
| Canada | Oranges | Units | ### |
| Canada | Oranges | Revenue | ### |
| Canada | Oranges | Cost | ### |
| Mexico | Oranges | Units | ### |
| Mexico | Oranges | Revenue | ### |
| Mexico | Oranges | Cost | ### |

Associated Formula file for matrix 1

Revenue = Matrix 3::Price * Matrix 2::USD FX Rate * Units
Cost = Matrix 3::Cost * Matrix 2::USD FX Rate * Units

Matrix 3

| Country [linkKey] | Product [linkKey] | Metric | Value |
|---|---|---|---|
| USA | Oranges | Price | ### |
| USA | Oranges | Cost | ### |
| Canada | Oranges | Price | ### |
| Canada | Oranges | Cost | ### |
| Mexico | Oranges | Price | ### |
| Mexico | Oranges | Cost | ### |
| USA | Apples | Price | ### |
| USA | Apples | Cost | ### |
| Canada | Apples | Price | ### |
| Canada | Apples | Cost | ### |
| Mexico | Apples | Price | ### |
| Mexico | Apples | Cost | ### |

FIG. 18

SYSTEMS AND METHODS FOR MODELING DATA IN A CLOUD-BASED ARCHITECTURE

CROSS-REFERENCE TO RELATED APPLICATIONS

The current application claims priority to U.S. Provisional Patent Application No. 63/032,355 entitled "Systems and Methods for Modeling Data in a Cloud-Based Architecture", filed May 29, 2020, the disclosure of which is incorporated herein by reference.

FIELD OF THE INVENTION

The present invention generally relates to modeling data and, more specifically, modeling data in cloud-based architectures.

BACKGROUND

Spreadsheets have long served as tools for storing, modeling, analyzing, and presenting data of various different types. They have provided powerful tools for modeling data, allowing for flexible and dynamic models that can provide insights for forecasting, planning, budgeting, as well as financial modeling. However, especially as spreadsheet models become increasingly complex and spread across various files and authors, the ability to verify and audit their correctness becomes increasingly difficult. Small errors in a single cell or calculation can have rippling effects throughout a model, which can be difficult to troubleshoot. In addition, spreadsheets have often relied on a fixed format or structure, complicating the need to see various views of a set of data. In many cases, spreadsheets are file-based, which can limit the ability to share, collaborate, or protect the data, especially as datasets continue to grow.

SUMMARY OF THE INVENTION

Systems and methods for modeling data in accordance with embodiments of the invention are illustrated. One embodiment includes a system for modeling data, the system comprising a data modeling platform application configured to operate on a set of one or more servers to provide a database layer configured to store data for a set of one or more models. The data for each model is based on a multi-dimensional structure and is stored as one or more one-dimensional vectors. The data modeling platform application is further configured to provide a data modeling application layer comprising a multi-dimensional data interface that provides access to the database layer, and a calculation engine configured to perform calculations across multi-dimensional structures for the set of models. The system further includes a client application configured to transmit requests for data for at least one of the set of models to the data modeling platform application.

In a further embodiment, the data modeling platform application further includes a chart engine configured to receive data via the database layer based on the requests from the client application, identify dimensions associated with the received data, and generate a chart to visualize the received data along at least two of the associated dimensions.

In still another embodiment, the chart engine is configured to generate several charts for values of a particular dimension to visualize the received data relative to at least one orthogonal dimension. Each chart is a sparkline chart associated with a series of values for the particular dimension relative to items or members of one or more of the orthogonal dimensions, and each sparkline chart is a user interface item presented in the client application, wherein selection of one or more sparklines displays a full-screen chart for the set of selected series.

In a still further embodiment, the chart engine is further configured to display the chart at the client application, and provide a set of user interface tools for updating the chart.

In yet another embodiment, the data modeling platform application further includes a user management module, wherein the user management module communicates with multi-dimensional data interface to return a user-specific subset of data in response to the request for data, wherein the user multi-dimensional data interface generates a query to retrieve data from the database layer based on user permissions from the user management module.

In a yet further embodiment, the user permissions restrict access to certain items or members for at least one dimension of the multi-dimensional structure.

In another additional embodiment, the multi-dimensional data interface is configured to provide access to linked dimensions located across multiple matrices, wherein the database layer stores each matrix as a one-dimensional vector.

In a further additional embodiment, the multi-dimensional data interface is configured to access data along a particular dimension of the multi-dimensional structure using finite arithmetic progressions.

In another embodiment again, the multi-dimensional data structure includes a set of one or more calculated fields, wherein each calculated field indicates a calculation involving one or more dimensions of the multi-dimensional data structure.

In a further embodiment again, the requests for data from the client application make changes to data in the multi-dimensional data structure, and the calculation engine is configured to update the multi-dimensional data structure based on the requests.

In still yet another embodiment, updating the multi-dimensional data comprises determining whether to perform a full evaluation or a partial evaluation based on an expected effect of the changes to data, and performing the evaluation accordingly.

In a still yet further embodiment, the partial evaluation includes evaluating dependencies by determining whether any of the set of calculated values are affected by the changes to the data, and updating the affected calculated values, wherein the calculation engine is further configured to iteratively evaluate dependencies on the updated calculated values.

In still another additional embodiment, the full evaluation includes evaluating dependencies by identifying matrix level dependencies, loading matrices into memory, evaluating formulas, determining result cuboids, determining source cuboids, determining formula level dependencies, and calculating results.

In a still further additional embodiment, the one-dimensional vector is stored with metadata separators between fields of the vector, wherein the metadata separators include metadata related to an associated field.

In still another embodiment again, the database layer is configured to analyze queries for data from the database, reorganize data from a one-dimensional vector to optimize data access based on the analyzed queries, and provide portions of data from the one-dimensional vector.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

FIG. 11 illustrates an example of a user interface with sparklines.

FIG. 14 illustrates an example of queries from query generation in accordance with an embodiment of the invention.

FIG. 16 illustrates examples of a vector representation of multi-dimensional data.

FIG. 18 illustrates example data file structures for archiving snapshots in accordance with an embodiment of the invention.

DETAILED DESCRIPTION

Figure 1:
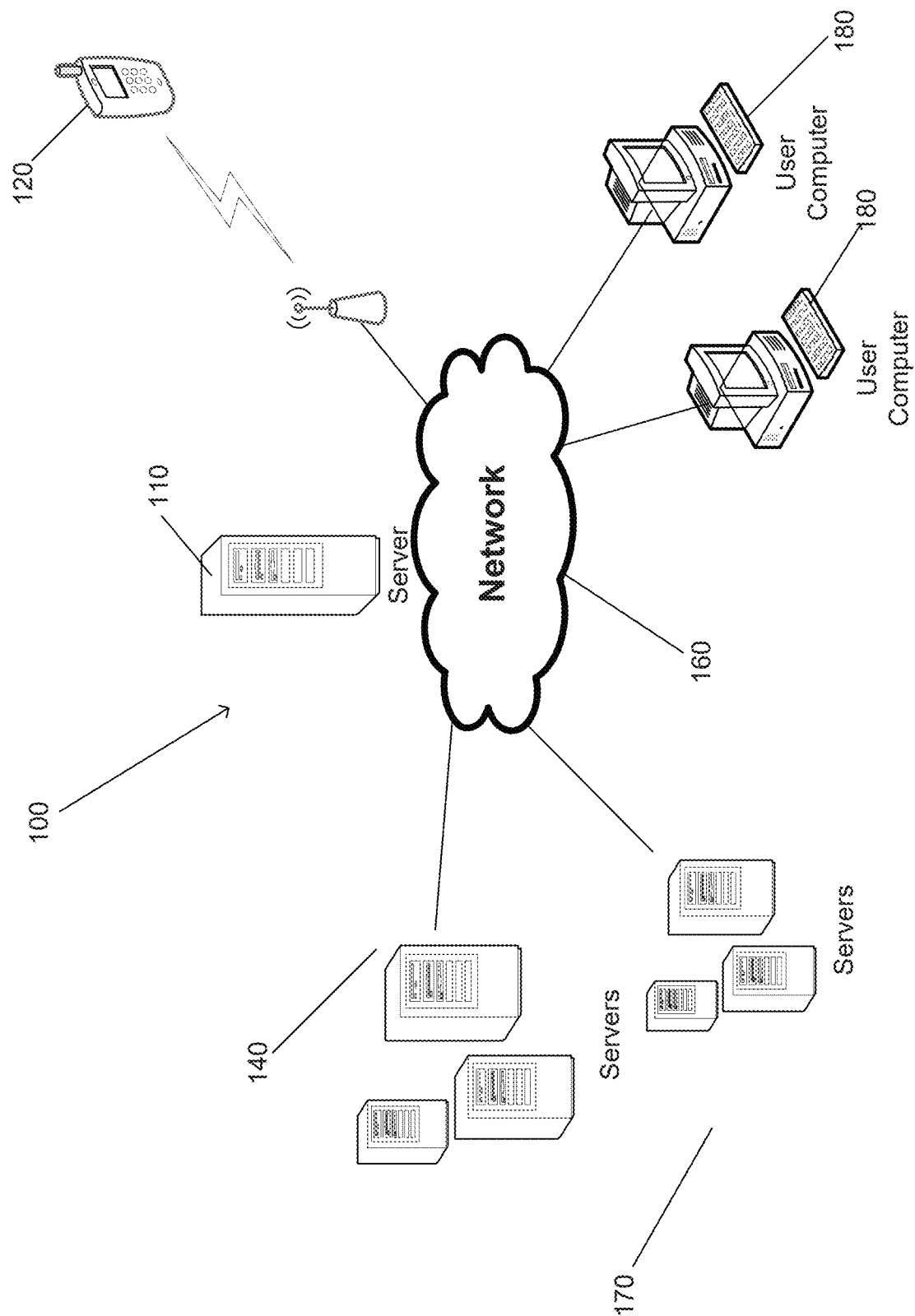
FIG. 1 illustrates a data modeling application platform system in accordance with an embodiment of the invention.

Systems and methods for modeling data in a cloud-based computing system are disclosed. Data modeling application platforms in accordance with various embodiments of the invention can utilize multi-dimensional (n-dimensional) representations (e.g., cubes, matrices) of data for building models. In many embodiments, formulas defined within the data modeling application platform describe the manner in which dimensions within the n-dimensional data are related. When the data modeling application platform calculates the formula, the result is a dimension within the n-dimensional data. The ability of many data modeling application platforms to provide a single universal definition of a formula describing the relationship between dimensions within n-dimensional data provides a powerful benefit when compared to cloud based spreadsheet applications that typically require formulas to be separately entered into discrete cells within a workbook, which is prone to error and/or inconsistency when a workbook is accessed by multiple users. In a number of embodiments, the data modeling application platform also enables multiple users to obtain different views within the n-dimensional data by enabling selection of the dimensions that are presented to each user and/or through the use of permissions that restrict the portions of the n-dimensional data that are accessible (hence viewable) by a particular user.

Systems in accordance with a number of embodiments of the invention can provide data modeling application platforms that can model data in a manner that provides secure and efficient data access for multiple users on a shared dataset. In several embodiments, developed models can be used directly and/or can be wrapped up as a data source in other applications. Data modeling application platforms in accordance with some embodiments of the invention can provide for versioning and control of the data with auditable snapshots that can be customized for each user. In a number of embodiments, data modeling application platforms can provide simplified interfaces and representations for calculated fields (e.g., formulas, summaries, etc.), which can simplify updates and/or reduce the introduction of user errors. Data modeling application platforms in accordance with a number of embodiments of the invention can include chart engines that can automatically generate various charts based on analysis of the data and/or of metadata related to the data.

As models grow in complexity and size, it can be inefficient to use a single n-dimensional data representation. Systems in accordance with a variety of embodiments of the invention can utilize sets of matrices to represent the n-dimensional data, where matrices can share dimensions. In many embodiments, multiple n-dimensional models can be linked by shared dimensions and logic. In several embodiments, n-dimensional data within a data modeling application platform can be quickly stored and/or accessed using processes including (but not limited to) finite arithmetic progressions (FAPs). FAPs in accordance with several embodiments of the invention can be used to quickly locate elements within a matrix. An example of a process for accessing vector data using FAPs is illustrated below with reference to FIGS. 16-17.

In a number of embodiments, the data modeling application platform does not store dependency graphs in memory. Instead, the modeling application platform responds to modification of data values by determining dependencies for modified data elements in real time based upon defined formulas including dimension(s) containing the modified data values.

In a number of embodiments, queries can be generated based on dimensional formulas that can tie data across different dimensions. Processes in accordance with certain embodiments of the invention can build and update queries based on data in the dimensions. In numerous embodiments, processes can update queries to only include new data (e.g., newly added data, changes in a user's model, etc.). Data modeling application platforms and methods of modeling data using a distributed computing system in accordance with various embodiments of the invention are discussed further below.

Data Modeling Application Platform System

A data modeling application platform system in accordance with an embodiment of the invention is illustrated in FIG. 1. Network 100 includes a communications network 160. The communications network 160 is a network such as the Internet that allows devices connected to the network 160 to communicate with other connected devices. Server systems 110, 140, and 170 are connected to the network 160. Each of the server systems 110, 140, and 170 is a group of one or more servers communicatively connected to one another via internal networks that execute processes that provide cloud services to users over the network 160. For purposes of this discussion, cloud services are one or more applications that are executed by one or more server systems to provide data and/or executable applications to devices over a network. The server systems 110, 140, and 170 are shown each having one or three servers in the internal network. However, the server systems 110, 140 and 170 may include any number of servers and any additional number of server systems may be connected to the network 160 to provide cloud services. In accordance with various embodiments of this invention, a modeling system that uses systems and methods that can model data in accordance with an embodiment of the invention may be provided by a process being executed on a single server system and/or a group of server systems communicating over network 160.

Users may use personal devices 180 and 120 that connect to the network 160 to perform processes that can model data in accordance with various embodiments of the invention. In the illustrated embodiment, the personal devices 180 are shown as desktop computers that are connected via a conventional "wired" connection to the network 160. However, the personal device 180 may be a desktop computer, a laptop computer, a smart television, an entertainment gaming console, or any other device that connects to the network 160 via a "wired" connection. The mobile device 120 connects to network 160 using a wireless connection. A wireless connection is a connection that uses Radio Frequency (RF) signals, Infrared signals, and/or any other form of wireless signaling to connect to the network 160. In FIG. 1, the mobile device 120 is a mobile telephone. However, mobile device 120 may be a mobile phone, Personal Digital Assistant (PDA), a tablet, a smartphone, or any other type of device that connects to network 160 via wireless connection without departing from this invention.

As can readily be appreciated the specific computing system used to model data is largely dependent upon the requirements of a given application and should not be considered as limited to any specific computing system(s) implementation. The specific manner in which computer systems similar to those discussed above with respect to FIG. 1 can be utilized to implement data modeling application platforms that enable multiple users to interact with data and perform modeling operations in accordance with various embodiments of the invention is discussed further below.

Data Modeling Element

Figure 2:
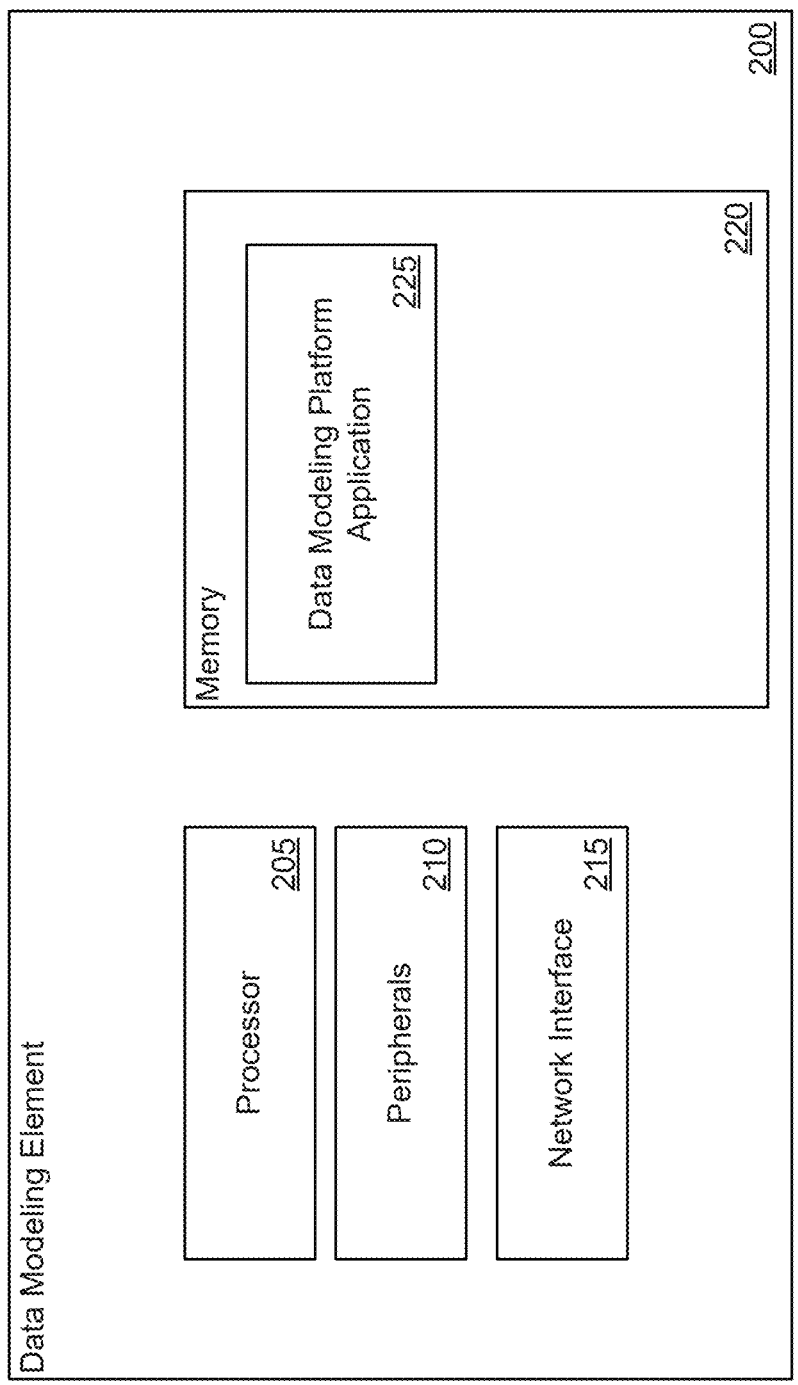
FIG. 2 illustrates an example of a data modeling element that executes instructions to perform processes for data modeling in accordance with various embodiments of the invention.

An example of a data modeling element that executes instructions to perform processes for data modeling in accordance with various embodiments of the invention is illustrated in FIG. 2. Data modeling elements in accordance with many embodiments of the invention can include (but are not limited to) one or more of mobile devices, cameras, databases, cloud services, servers, and/or other computers. Data modeling client 200 includes processor 205, peripherals 210, network interface 215, and memory 220. One skilled in the art will recognize that a particular data modeling element may exclude certain components and/or include other components that are omitted for brevity without departing from this invention.

The processor 205 can include (but is not limited to) a processor, microprocessor, controller, or a combination of processors, microprocessor, and/or controllers that performs instructions stored in the memory 220 to manipulate data stored in the memory. Processor instructions can configure the processor 205 to perform processes in accordance with certain embodiments of the invention.

Peripherals 210 can include any of a variety of components for capturing data, such as (but not limited to) mouse, keyboard, microphone, cameras, displays, and/or sensors. In a variety of embodiments, peripherals can be used to gather inputs and/or provide outputs. Network interface 215 allows data modeling client 200 to transmit and receive data over a network based upon the instructions performed by processor 205. Peripherals and/or network interfaces in accordance with many embodiments of the invention can be used to gather data and/or user inputs (e.g., voice inputs, GUI interactions, etc.) that can be used to interact with a data modeling platform.

Memory 220 includes a data modeling platform application 225. Data modeling platform applications in accordance with several embodiments of the invention can be used to perform one or more functions of a data modeling application platform to model data. In certain embodiments, various functions described with reference to the data modeling application platform can be performed using one or more data modeling platform applications across one or more data modeling elements.

Although a specific example of a data modeling element 200 is illustrated in FIG. 2, any of a variety of data modeling elements can be utilized to perform processes for modeling data similar to those described herein as appropriate to the requirements of specific applications in accordance with embodiments of the invention.

Data Modeling Application Platforms

Figure 3:
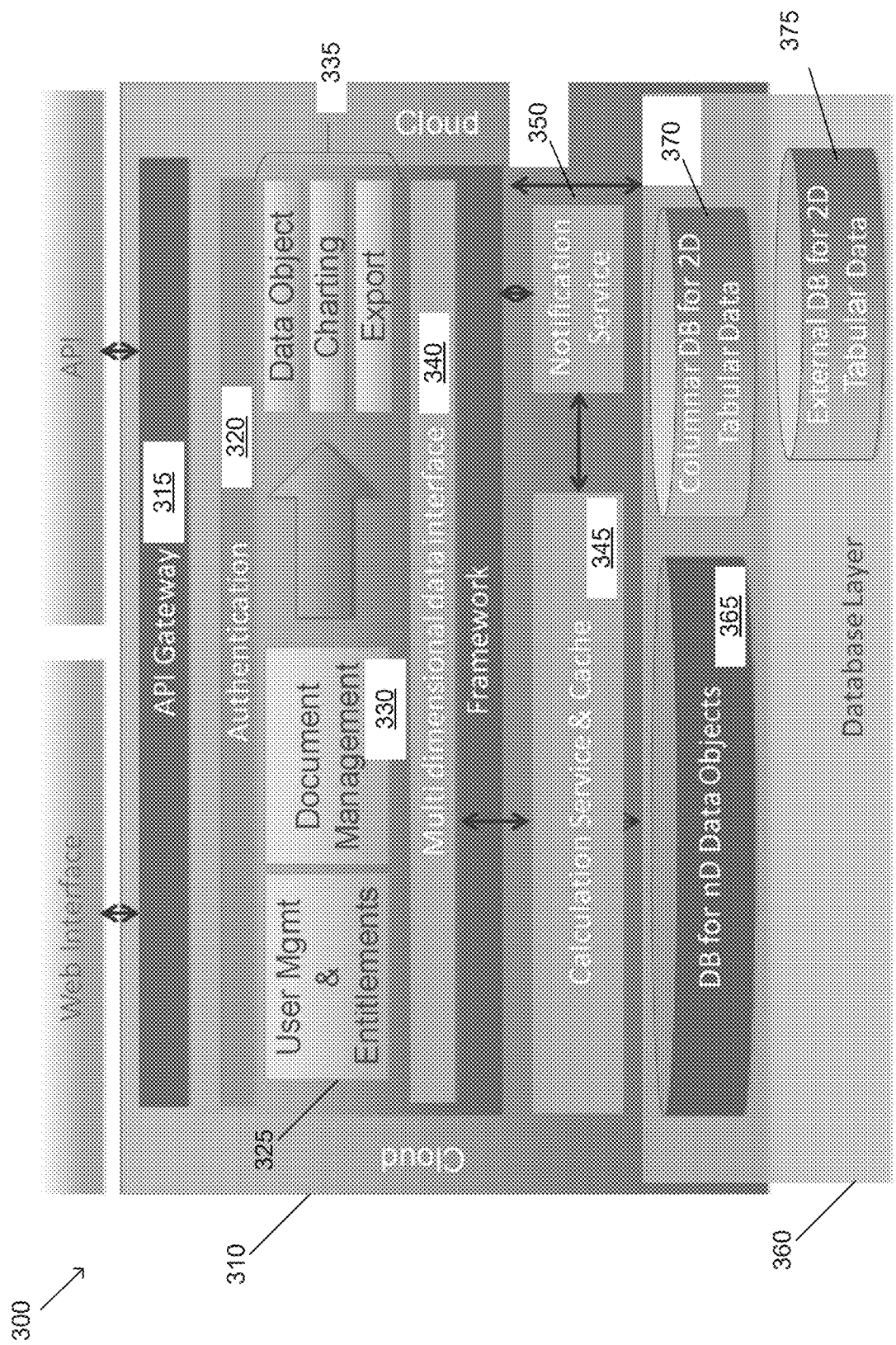
FIG. 3 illustrates an example of a cloud-based data modeling application platform that executes instructions to perform processes that can model data in accordance with various embodiments of the invention.

An example of a cloud-based data modeling application platform that executes instructions to perform processes that can model data in accordance with various embodiments of the invention is illustrated in FIG. 3. Data modeling application platforms in accordance with many embodiments of the invention can include functions and/or services provided by one or more devices, such as (but are not limited to) one or more mobile devices, servers, desktop computers, and/or other computing devices. The data modeling application platform 300 includes a data modeling application layer 310 and a database layer 360. One skilled in the art will recognize that a particular data modeling platform may exclude certain components and/or include other components that are omitted for brevity without departing from this invention.

Data modeling application platforms in accordance with various embodiments of the invention can provide web interfaces and/or provide access to data through application programming interfaces (APIs). In some embodiments, data modeling application layers can perform various functions to model and manipulate data for users of a data modeling application. Database layers in accordance with numerous embodiments of the invention can provide access (storage and/or retrieval) to data storages and/or data storage services.

Data Modeling Application Layer

In the example of FIG. 3, data modeling application layer 310 includes an application programming interface (API) gateway 315, authentication modules 320, user management and entitlement modules 325, document management modules 330, output engines 335, a multi-dimensional data interface 340, calculation service and cache modules 345, and a notification service 350. One skilled in the art will recognize that a particular data modeling application layer may exclude certain components and/or include other components that are omitted for brevity without departing from this invention.

API gateway 315 provides an interface for an API and a Web Interface to the data modeling application layer 310. API gateways in accordance with several embodiments of the invention can provide web interfaces and/or APIs to allow applications to access data modeling frameworks. In various embodiments, API gateways can provide a library for creating matrices, as well as functions for various operations on the matrices, such as (but not limited to) title generation, composite recognition, etc. Such a library can be used to flexibly provide access to the matrix data to any charting tool.

In various embodiments, authentication modules 320 can be used to authenticate users of a data modeling application platform before allowing a user access to data within the system. User management and entitlement modules 325 in accordance with a variety of embodiments of the invention can determine whether a user can access certain data and/or functions within the platform. Access in accordance with many embodiments of the invention can be provided using dimensional permissions that provide granular levels of control for different dimensions of a model. In a number of embodiments, users can be granted access to different portions or views of the data based on their role and/or status.

Document management module 330 can interact with multi-dimensional data interface 340 to manage and arrange documents of a data model. Document management modules in accordance with a variety of embodiments of the invention can be services that manage matrices and/or 2D tables (as abstractions of underlying matrices and/or 2D tables) to provide a way of arranging data in a model and controlling access. In some embodiments, document management modules can provide container folders, shared libraries, and/or linked n-dimensional representations. Container folders in accordance with several embodiments of the invention define a group of data sources (e.g., matrices) that can interact with each other. For example, dimensions for a model in accordance with numerous embodiments of the invention can be linked to dimensions within other matrices in the same folder (see discussion below). In numerous embodiments, in addition to matrices in the same folder, organizational dimension repositories can be shared and made accessible for any model within the organization. In some embodiments, each container folder can include a different n-dimensional model.

Data modeling application platforms in accordance with various embodiments of the invention can include multi-dimensional data interfaces 340 that can provide access to the data for user management, document management, data output, etc. In a variety of embodiments, multi-dimensional data interfaces can provide various functions for accessing data from databases and/or calculation service and cache modules 345. Multi-dimensional data interfaces in accordance with a variety of embodiments of the invention can provide various functions such as (but not limited to) accessing and/or storing flat data vectors and/or linking dimensions across data matrices.

In various embodiments, notification services 350 can provide various notifications for a data modeling application platform. Notification services in accordance with certain embodiments of the invention can manage locking cell-level access and/or provide notifications to enforce cell-level access. In certain embodiments, notification services can also provide other notifications, such as (but not limited to) alerts, reminders, and/or update information.

Output engines 335 in accordance with certain embodiments of the invention can include (but are not limited to) data object engines, chart engines, and/or export engines. In certain embodiments, outputs can include exported representations of the data that are formatted for use in other third-party applications. For example, output engines in accordance with certain embodiments of the invention can determine a desired structure for the data in order to output the necessary data to be visualized through data visualization tools (e.g., TABLEAU). In various embodiments, output engines can create data objects that can be passed to other applications (e.g., through APIs and/or a web interface).

Figure 4:
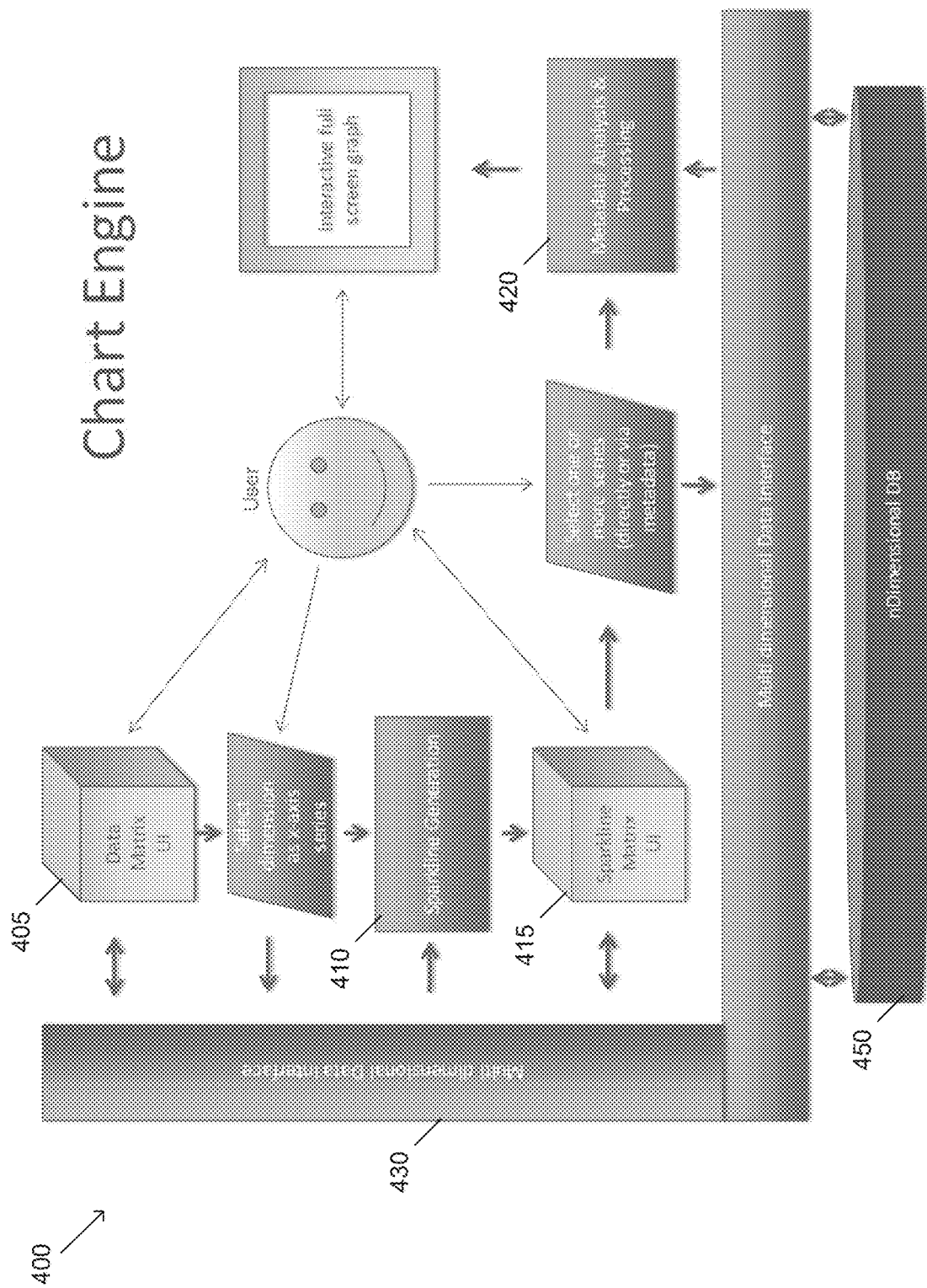
FIG. 4 illustrates an example of a chart engine in accordance with an embodiment of the invention.

Chart engines in accordance with several embodiments of the invention can create any of a variety of different charts, including (but not limited to) line charts, bar charts, sparklines, waterfall charts, scatter plots, column clusters, etc. An example of a chart engine in accordance with an embodiment of the invention is illustrated in FIG. 4. In this example, chart engine 400 includes a data matrix UI 405, sparkline generation engine 410, sparkline matrix UI 415, and metadata analysis and processing engine 420. Chart engine 400 can communicate via the multi-dimensional data interface 430 to access an n-dimensional database 450. Data matrix UI 405 can provide an interface to display data matrices to a user. The user can then select dimensions from a matrix as an x-axis series. Sparkline generation engines can automatically generate sparkline representations of the data based on a selected x-axis series. In several embodiments, sparklines can be incorporated as a part of a sparkline matrix UI, which presents sparklines for the different series as user-selectable affordances. When the sparkline for a given series is selected by the user, metadata analysis and processing engines can analyze data from the n-dimensional database based on the selected series to present an interactive full screen graph. An example of a sparkline process is described in further detail with reference to FIG. 11.

Calculation engines (or calculation service and cache modules) in accordance with a variety of embodiments of the invention can perform calculations for modeling n-dimensional data. In a variety of embodiments, calculation engines can be serverless compute services (e.g., AMAZON WEB SERVICES LAMBDA). Calculation engines in accordance with many embodiments of the invention can resolve formulas in models using dynamic discovery of dependency graphs, which can allow a system to leverage compute resources rather than memory resources. Dynamic discovery in accordance with many embodiments of the invention can allow for calculations to proceed without need to traverse an entire dependency graph. In some embodiments, dynamic discovery can allow for slices to be parallelized. In various embodiments, calculation engines can be used to aggregate (e.g., sum, average, median, etc.) data to provide summaries of the data within a model.

Database Layer

Referring back to FIG. 3, the data modeling application platform 300 includes a database layer 360. The database layer 360 includes a primary database 365 for n-dimensional data objects, columnar database 370 for 2D tabular data, and/or an external database 375 for 2D tabular data. Databases for n-dimensional data objects in accordance with a number of embodiments of the invention can include a structureless database that can provide fast access to n-dimensional matrices for the data. In many embodiments, databases for n-dimensional data objects (e.g., flattened to one dimensional vectors) can include NoSQL (e.g., MongoDB, etc.) databases. In certain embodiments, any storage engine that supports fast file storage and access could be used. Storing the data in an unstructured system in accordance with certain embodiments of the invention avoids the creation of an index and can allow for faster access to the underlying data stored within the primary database.

In a number of embodiments, data modeling application platforms can import data into internal 2D tabular databases to allow users to create formulas and references based on the imported data. Importing in accordance with various embodiments of the invention can be performed periodically, according to a schedule, etc. In several embodiments, imports can be restricted to update a subset of the data (e.g., only changed rows) or so that different subsets of the data (e.g., within a single data source and/or across multiple data sources) are updated at different times.

Alternatively, or conjunctively, database layers in accordance with many embodiments of the invention can allow users to directly pull information (e.g., via queries) from an external database as a part of resolving formulas within a model. In certain embodiments, database layers can interact with external databases via optimized queries. While some systems run queries against an entire database, data modeling application platforms in accordance with some embodiments of the invention can query against subsets of the database (e.g., by year). As databases grow in size, this puts an increasing demand on memory and processing power and as such querying against subsets can be beneficial.

In many embodiments, queries are optimized to determine what portions of the databases are required for a given query (or formula). Required portions of the database may depend on various conditions from the data (e.g., month, statement, department, year, etc.). Database layers in accordance with numerous embodiments of the invention can determine an intersection based on the conditions to generate an optimized query. In some embodiments, an optimized query can include supplemental queries that can be generated based on what data has already been retrieved. An example of a process for generating queries in accordance with various embodiments of the invention is described in greater detail with reference to FIG. 15.

In a variety of embodiments, optimized queries may become overly complicated and may be evaluated to ensure they do not exceed a given complexity threshold (e.g., a length of the query). When a query is determined to be overly complex, processes can pull larger portions of the database (e.g., into memory and/or into an internal database) and perform processes to filter the data after the data has been loaded. In a number of embodiments, database layers can periodically (e.g., hourly, prior to each data import, etc.) check for structural changes in the external databases. When database layers directly connect to databases (or data warehouses), checks for structural changes in accordance with numerous embodiments of the invention can be performed for each query against a database.

Figure 5:
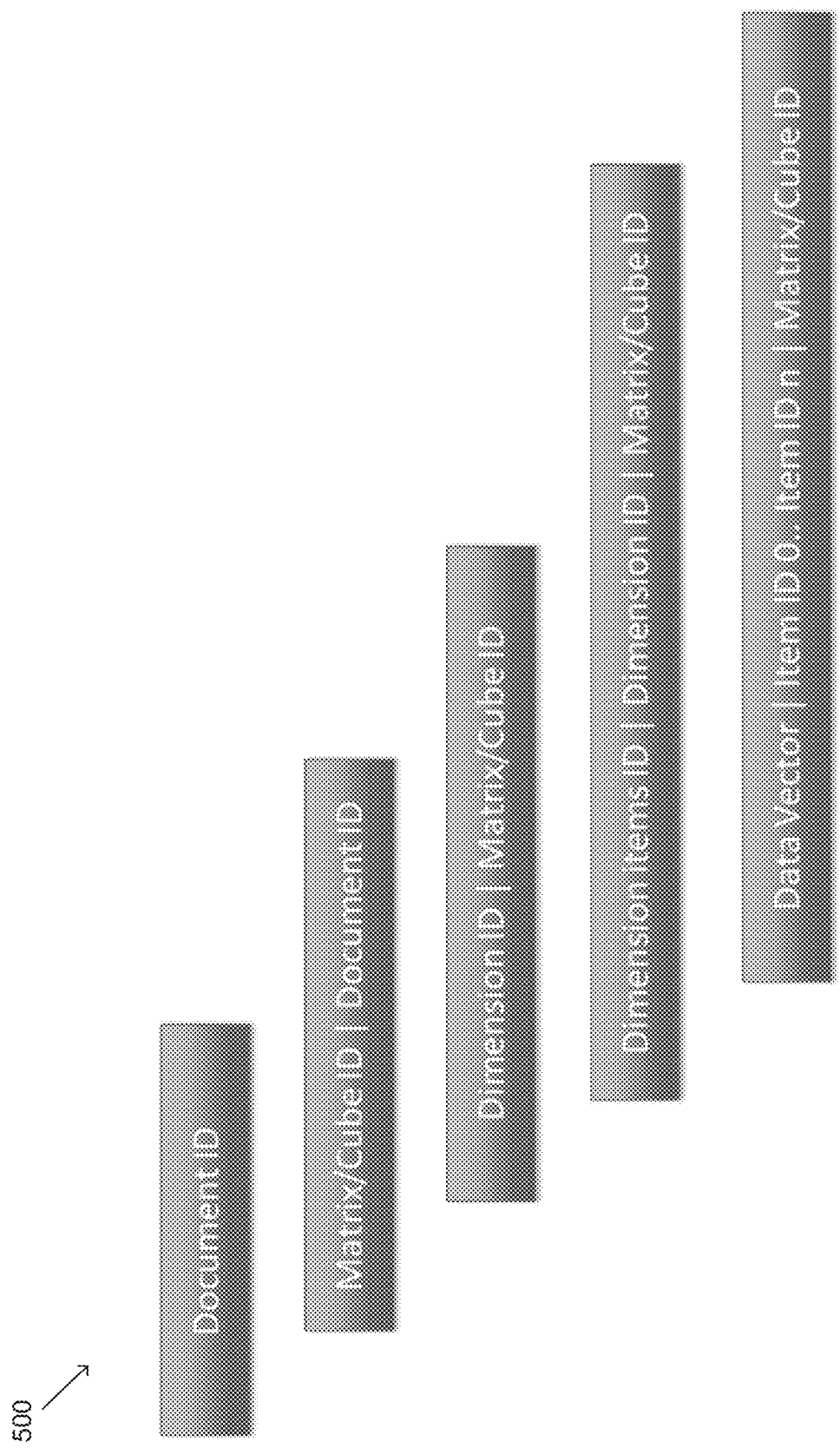
FIG. 5 illustrates an example of a database structure for storing an n-dimensional data source (or cube) in accordance with an embodiment of the invention.

An example of a database structure 500 for storing an n-dimensional data source (or cube) in accordance with an embodiment of the invention is illustrated in FIG. 5. In a number of embodiments, storing n-dimensional data in databases rather than in individual files can allow for increased functionality such as (but not limited to) collaboration of multiple users on a single dataset, permissions control for various subsets of the data, shared libraries, etc. In some embodiments, databases can be structured to provide document level and/or dimensional permissions. When models are shared among different groups, the views presented to different users may differ based on their permissions for a given dimension. In this way, everyone is accessing the same data (i.e., different groups do not have their own versions of the truth), but each user's view of that data is filtered by what is coming through their slice. Dimensional permissions in accordance with numerous embodiments of the invention can be determined based on a user's position in an organization, their membership in a group, etc.

Dimensional permissions in accordance with a number of embodiments of the invention can allow a user (e.g., a model designer) to limit the user access to only those parts of the model that the user is allowed to see and hence prevent the user from accessing data to which they do not have permission. In several embodiments, dimensional permissions can be set when a model is created, or any time thereafter. In a variety of embodiments, dimensional permissions can be used to filter out the data that a given user has no rights to see.

Figure 6:
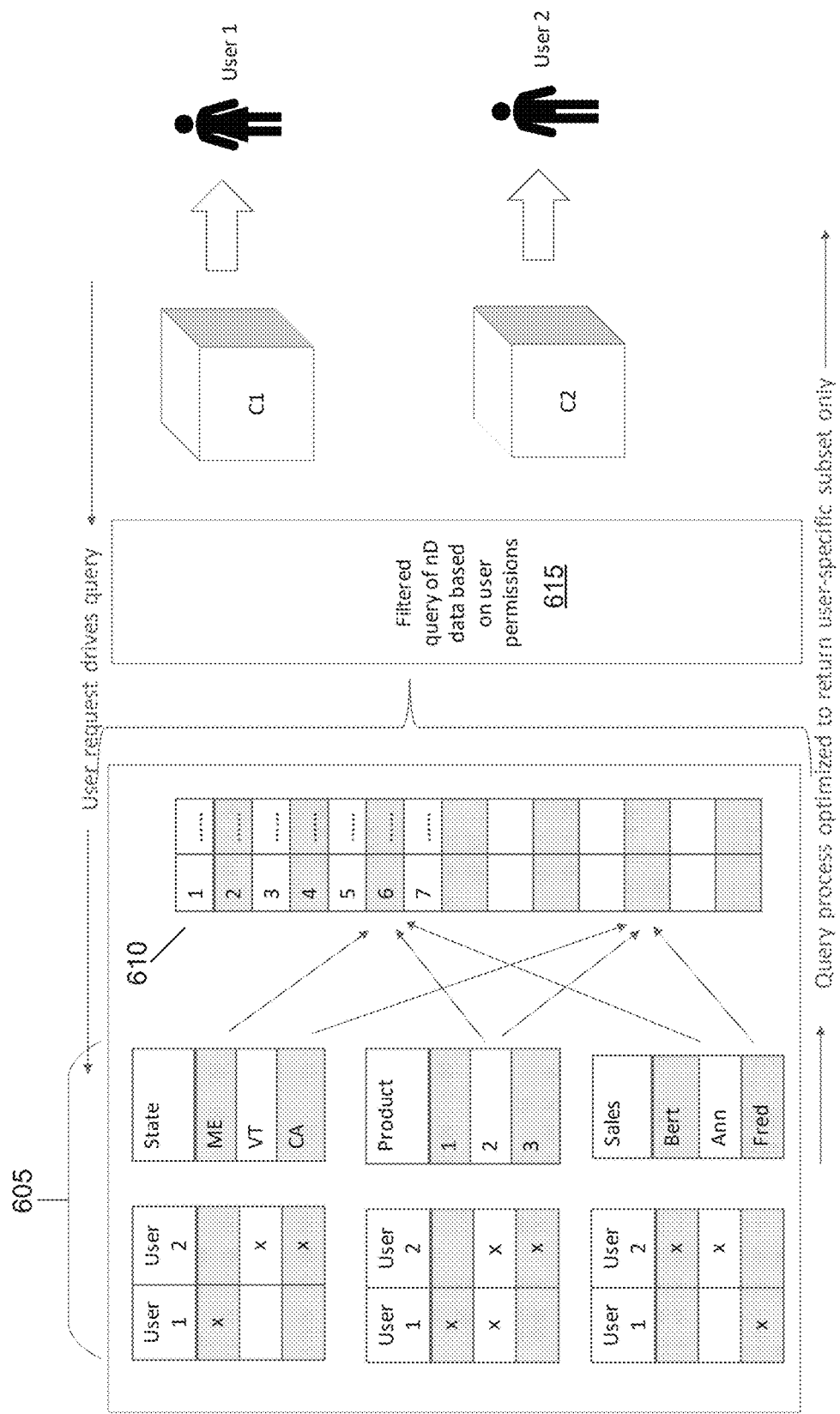
FIG. 6 illustrates an example of dimensional permissions in accordance with an embodiment of the invention.

An example of dimensional permissions in accordance with an embodiment of the invention is illustrated in FIG. 6. In this example, Users 1 and 2 make user requests that drive a query. Both users may provide the same query to the system, but they each have different dimensional permissions. Their dimensional permissions are illustrated in the metadata 605, which indicates each user's permissions to various elements of different dimensions. For example, User 1 has access to data for Maine (ME), products 1 and 2, and sales for Fred. User 2 has access to data for Vermont (VT) and California (CA), products 2 and 3, and sales for Bert and Ann. Users may have exclusive access (e.g., User 1 with exclusive access to data for product 1) and/or overlapping access (e.g., Users 1 and 2 both have access to data for product 2) to different dimensions.

In the example of this figure, Users 1 and 2 each request all of the available data stored in data vector 610. Based on the dimensional permissions metadata 605, a filtered query 615 is generated based on various filters, including (but not limited to) user permissions, field aggregation metadata (e.g., metadata describing how/whether a field should be aggregated), user query parameters, etc. In numerous embodiments, data modeling platforms (e.g., via user management and entitlements modules and/or calculation engines) can implement permissions to ensure that user access to data across different views is properly and securely enforced. The filtered query 615 returns a subset of the data or "cubelet" to the user, providing only the data and information that the user has permission to see. This has the effect of significantly reducing the overhead associated with user queries thus improving efficiency and performance.

In several embodiments, each data matrix can be stored and/or exported as a single vector. In several embodiments, n-dimensional cubes can be flattened to a one-dimensional data vector. Vectors in accordance with some embodiments of the invention can be stored as delimited (e.g., comma-delimited, tab-delimited, etc.) vectors. In numerous embodiments, vector elements can be separated with object separators that provide additional metadata regarding the vector elements. For example, object separators in accordance with some embodiments of the invention can include different separators that indicate various metadata about a given value (or cell), such as (but not limited to) formatting, data type, etc., which can remove the need to maintain the metadata in a separate shadow table.

Vectors in accordance with certain embodiments of the invention can be chunked and stored in a file system (e.g., GridFS, MongoDB, etc.) optimized for storing large amounts of unstructured data. In several embodiments, storing the data can include determining optimal chunk sizes for chunks to be distributed across multiple data servers. Optimal chunk sizes can significantly impact efficiency. In several embodiments, optimal chunk sizes can be determined based upon user behaviors (e.g., common queries, visualizations, etc.). When the data is retrieved, processes in accordance with a variety of embodiments of the invention can identify the chunk(s) containing the relevant data, load the chunk(s) into memory, and processes the loaded chunk(s). Similarly, when data is updated, only the relevant chunks are accessed and updated. In various embodiments, data can be restructured.

In numerous embodiments, chunking can be performed based on access to the data to optimize for fast access and to minimize memory usage. Processes in accordance with several embodiments of the invention can chunk data based on expected access to the data based on various parameters, such as (but not limited to) the usage of dimensions in formulas, a history of user access to certain dimensions, etc. Based on the expected access, processes in accordance with many embodiments of the invention can reorder and re-chunk the data to store as much of the high-access dimensions in earlier chunks so that fewer chunks are needed for the most frequent data accesses.

Data structures in accordance with certain embodiments of the invention can allow for permission-based chunk pre-loading for faster access to the relevant data. In many embodiments, data can be pre-loaded to support a user's queries. Pre-loading data in accordance with some embodiments of the invention can be based on user permissions to enable the user to freely rotate the cube (i.e., display different views of the data) while minimizing the number of times the data has to be accessed. In numerous embodiments, data can be pre-loaded into a cache so that the matrix does not have to be read from the database layer each time it is needed. Caches in accordance with some embodiments of the invention can load the entire matrix even if only parts of it are actually needed, allowing for flexibility in handling future requests (e.g., changes in view, access by other users, etc.). In certain embodiments, only certain slices of the matrix (i.e., a cubelet) can be cached, e.g., based on dimensional permission, the view on the screen of the user at a client device, partial calculation of certain slices of the matrix, etc.

In several embodiments, caching can also be performed at a client device. In certain embodiments, data that is available to the user can be provided to a client device based on dimensional permissions. The data available for download to the client for a particular user (or a "cubelet") is the subset of the complete n-dimensional dataset available to that user. In numerous embodiments, client devices can download parts of the cubelet which are displayed on the screen. When the user starts to slice-and-dice the matrix, the same set of cells may often be enough to compose the new view (for example when rotating the cube). This can be done entirely on the client side. Communicating with the server is only necessary when additional data points are required to display the desired views of the cube. In a number of embodiments, a larger portion (or all) of the cubelet can be downloaded to the client device, allowing a user to freely manipulate the cubelet, without making further requests of the server and/or when connections to the servers are lost. In a number of embodiments, the portion of the cubelet to be downloaded can be determined based on typical user actions (e.g., paging to the preceding or following slice, etc.).

In a number of embodiments, vectors can be stored in a structureless database and mapping can be performed separately. When data is stored in vectors, it can be difficult to quickly access certain slices of the data as various non-contiguous positions on the disk can need to be accessed. Processes in accordance with many embodiments of the invention can provide fast access to certain slices of data using finite arithmetic progressions (FAPs). The use of FAPs can reduce the amount of memory (RAM) required and/or the speed with which the data can be accessed. FAPs in accordance with several embodiments of the invention can be used to quickly locate elements across dimensions in multi-dimensional data stored within a vector. Examples of FAPs are described in greater detail below with reference to FIGS. 16 and 17.

In certain embodiments, external databases, or warehouses, are often structured databases with 2D tabular data (e.g., tables in relational databases, comma-separated values (CSV), etc.). External data in accordance with several embodiments of the invention can be imported in a variety of different ways, such as (but not limited to) online analytical processing (OLAP) interactions, structured query language (SQL) queries, etc. Updates from such external data sources can be propagated through matrices (e.g., in calculated fields, linked fields, etc.) in various manners in accordance with various embodiments of the invention, such as (but not limited) periodic (e.g., nightly) updates, on-demand, upon detecting changes in a data source, etc.

Figure 7:
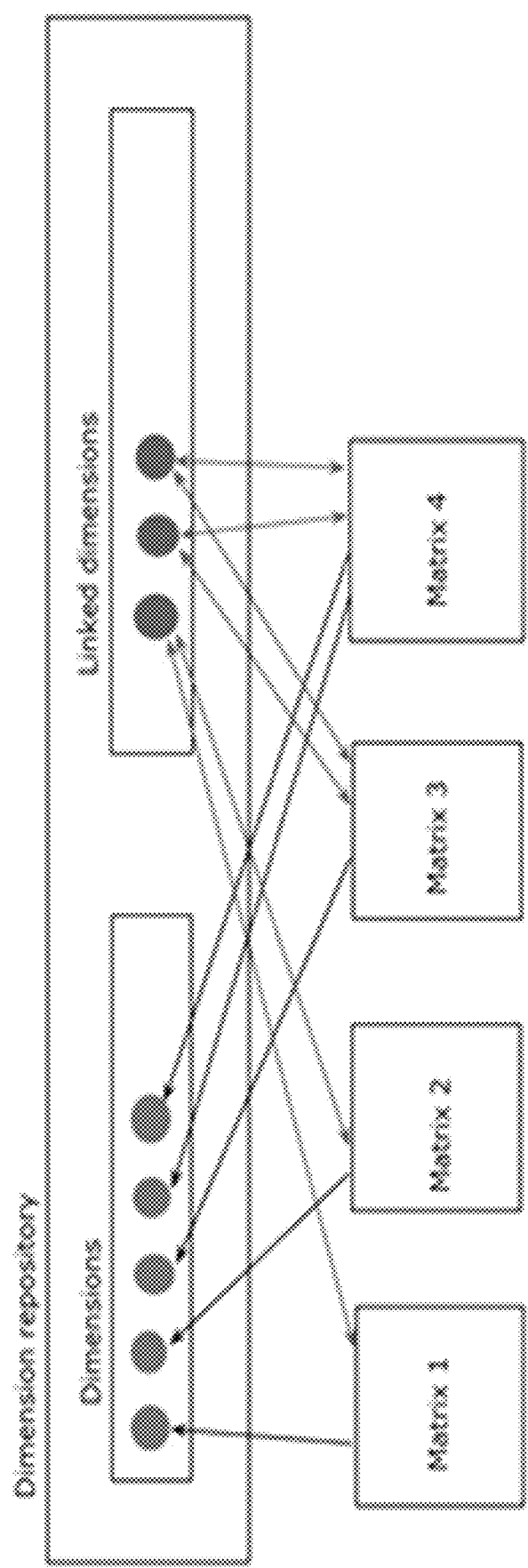
FIG. 7 illustrates an example of a database structure for linked dimensions in accordance with an embodiment of the invention.

An example of a database structure for linked dimensions in accordance with an embodiment of the invention is illustrated in FIG. 7. In this example, each matrix is a data object with one or more dimensions, the sizing or scope of which is based on an intersection of its dimensions. In many embodiments, n-dimensional data objects are comprised of dimensions, items which belong to, or are members of, dimensions, and data which belong to the intersections of the items in all the dimensions associated with an object. A column in tabular data structures (e.g., a table in a relational database), can be loosely or tightly related to a dimension, and to the items or members of that dimension, in an n-dimensional data object.

As shown in this example, dimensions for a matrix in accordance with many embodiments of the invention can include linked and/or unlinked dimensions. Linked dimensions in accordance with several embodiments of the invention can be shared across multiple matrices and changes made to a linked dimension will be reflected across all linked matrices. Matrices in accordance with a variety of embodiments of the invention can scale together along linked dimensions, but not with respect to unlinked dimensions. This can allow for a multi-dimensional model to be represented as a set of smaller, relevant "hypercubes" rather than a single large hypercube scaled to accommodate all dimensional elements.

In the example of FIG. 7, the four matrices are independent in relation to the unlinked dimensions, therefore any change to an unlinked dimension in one matrix (e.g., an addition, deletion or change to its items or dimension members) will have no impact on the other three matrices. However, a change to a linked dimension in Matrix 1 will propagate to Matrix 2, and similarly a change to one of the linked dimensions in Matrix 4 will propagate to Matrix 3. In this way, via the linked dimensions, the matrices are interrelated and will scale in a synchronous manner along their linked dimensions.

In certain embodiments, there is only a single instance of a linked dimension, regardless of the number of matrices that share the dimension. The matrices can utilize a single instance of the linked dimension, where the data structure for storing dimensions can support this "repository" of linked dimensions. In several embodiments, any action to change a linked dimension in any matrix containing that dimension can cause the single instance in the repository to be updated, and therefore all objects sharing that dimension will automatically be updated accordingly.

In some embodiments, dimensions can include calculated fields that can be defined by formulas. Formulas in accordance with certain embodiments of the invention can be built using dimensions and/or fields from within the same matrix or from other matrices within the model. In several embodiments, formulas can be written in such a way as to perform computations such as aggregations against data in the tabular structure based on the cross referencing of the values in parallel columns in the same table to dimension items in the matrix. Formulas in accordance with some embodiments of the invention can define the relation between tabular data and the n-dimensional matrix. For example, a column (e.g., Amount) from tabular data can be summarized into an item (e.g., Quantity) of a matrix based on a set of conditions (e.g., 'state' column of the tabular data corresponds with the 'location' dimension of the matrix).

Figure 12:
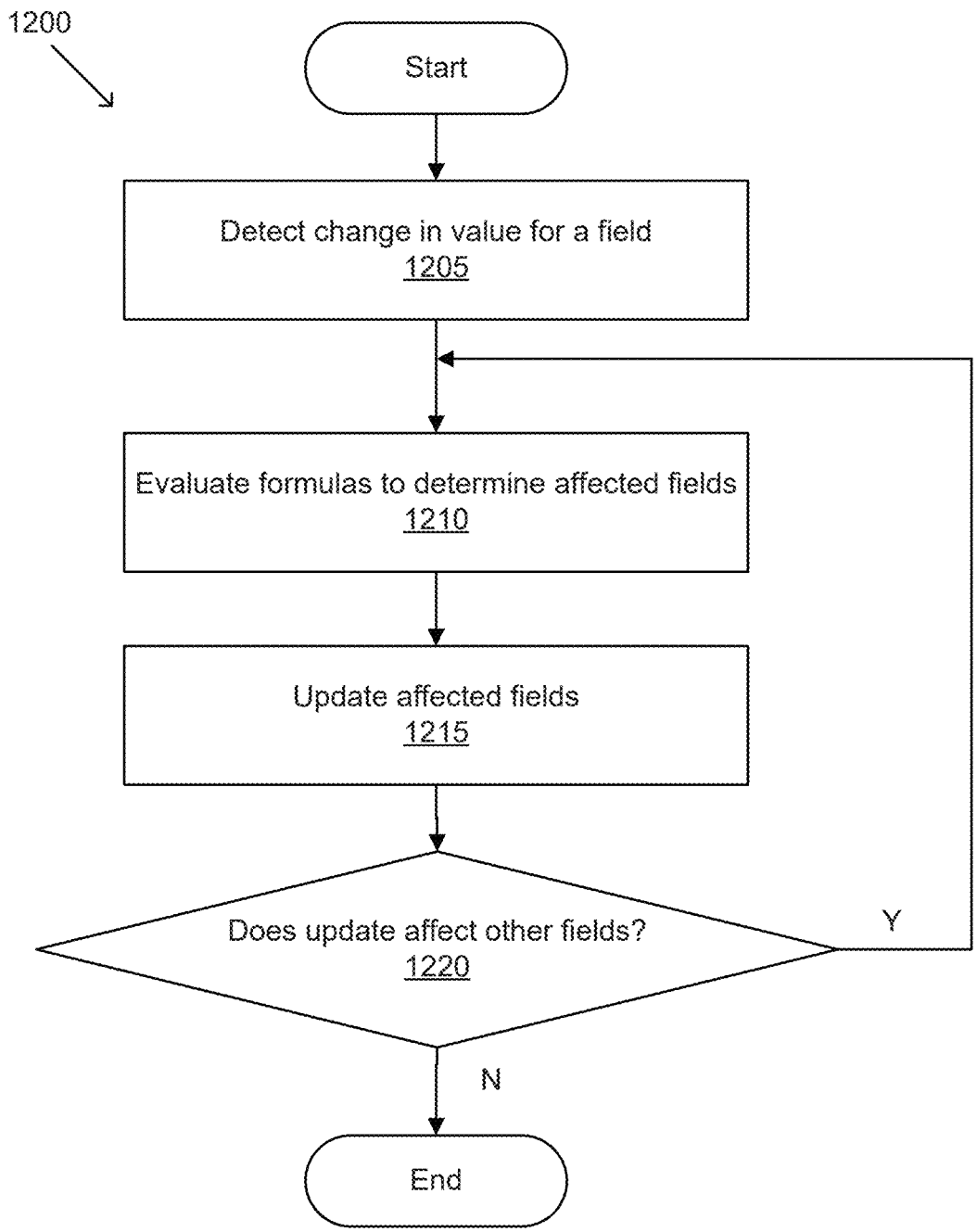
FIG. 12 conceptually illustrates an example of a process for dynamic discovery in accordance with an embodiment of the invention.

In some embodiments, changes to the formula for a calculated field can be re-mapped to new queries at a single point, such that the change is propagated to all uses of the calculated fields throughout the various models. An example of query generation in accordance with an embodiment of the invention is described in greater detail with reference to FIG. 12.

Database structures in accordance with several embodiments of the invention can include metadimensions that can provide a single definition for a dimension (e.g., division, product, etc.) that can remain consistent for models throughout an organization. In a variety of embodiments, data modeling application platforms can provide a shared library of linked dimensions and/or formulas for common dimensions and values that can be used throughout an organization. Shared libraries can allow for an organization to provide a single "true" definition for a defined value that can be audited at a single point, rather than formulas that are uninterpretable and distributed across multiple files, cells, and/or worksheets as with traditional spreadsheets. For example, an organization may provide a "product" dimension in a shared library, that would allow the sales team to use the same product definitions as the manufacturing and logistics teams. When new products are added, they can automatically become available for all of the different teams and be automatically updated in existing models.

While specific implementations of data modeling application platforms and architectures have been described above with respect to FIGS. 1-7, there are numerous configurations of data modeling application platforms, including, but not limited to, those using serverless architectures, distributed computing architectures, and/or any other configuration as appropriate to the requirements of a given application. In a number of embodiments, portions (user interface (UI) modules, etc.) of the platform may be implemented in a serverless architecture, while other portions (e.g., notification services, etc.) can be implemented in a conventional server-based architecture. Implementations in accordance with a number of embodiments of the invention can implement serverless architectures for a calculation engine. However, as serverless architectures lack a cache, calculation engines in accordance with numerous embodiments of the invention can be implemented in conjunction with a set of one or more memory servers. Furthermore, any of a variety of modules and databases can be utilized to implement data modeling application platforms capable of enabling multiple users to simultaneously interact with n-dimensional data as appropriate to the requirements of specific applications in accordance with various embodiments of the invention.

Data Modeling Client

Figure 8:
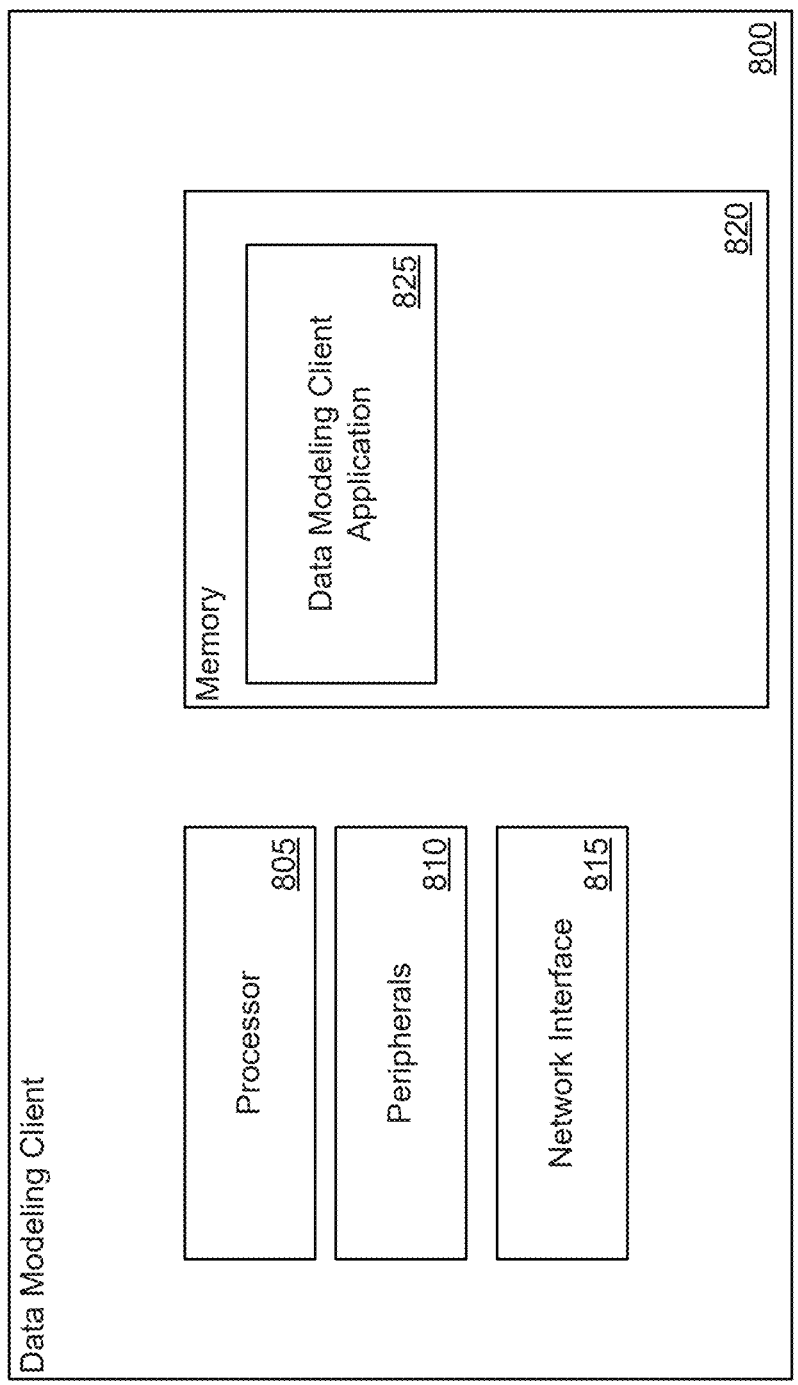
FIG. 8 illustrates an example of a data modeling client that executes instructions to perform processes for a data modeling application in accordance with various embodiments of the invention.

An example of a data modeling client that executes instructions to perform processes for a data modeling application in accordance with various embodiments of the invention is illustrated in FIG. 8. Data modeling clients in accordance with many embodiments of the invention can include (but are not limited to) one or more of mobile devices, cameras, and/or computers. Data modeling client 800 includes processor 805, peripherals 810, network interface 815, and memory 820. One skilled in the art will recognize that a particular data modeling client may exclude certain components and/or include other components that are omitted for brevity without departing from this invention.

The processor 805 can include (but is not limited to) a processor, microprocessor, controller, or a combination of processors, microprocessor, and/or controllers that performs instructions stored in the memory 820 to manipulate data stored in the memory. Processor instructions can configure the processor 805 to perform processes in accordance with certain embodiments of the invention.

Peripherals 810 can include any of a variety of components for capturing data, such as (but not limited to) mouse, keyboard, microphone, cameras, displays, and/or sensors. In a variety of embodiments, peripherals can be used to gather inputs and/or provide outputs. Network interface 815 allows data modeling client 800 to transmit and receive data over a network based upon the instructions performed by processor 805. Peripherals and/or network interfaces in accordance with many embodiments of the invention can be used to gather data and/or user inputs (e.g., voice inputs, GUI interactions, etc.) that can be used to interact with a data modeling application.

Memory 820 includes a data modeling client application 825. Data modeling client applications in accordance with several embodiments of the invention can be used to interact with a data modeling application platform to model data. In various embodiments, data modeling applications can provide a graphical user interface (GUI) for modeling data and/or interacting with existing models.

Although a specific example of a data modeling client 800 is illustrated in FIG. 8, any of a variety of data modeling clients can be utilized to perform processes for modeling data similar to those described herein as appropriate to the requirements of specific applications in accordance with embodiments of the invention.

Data Modeling Application Interface

Figure 9:
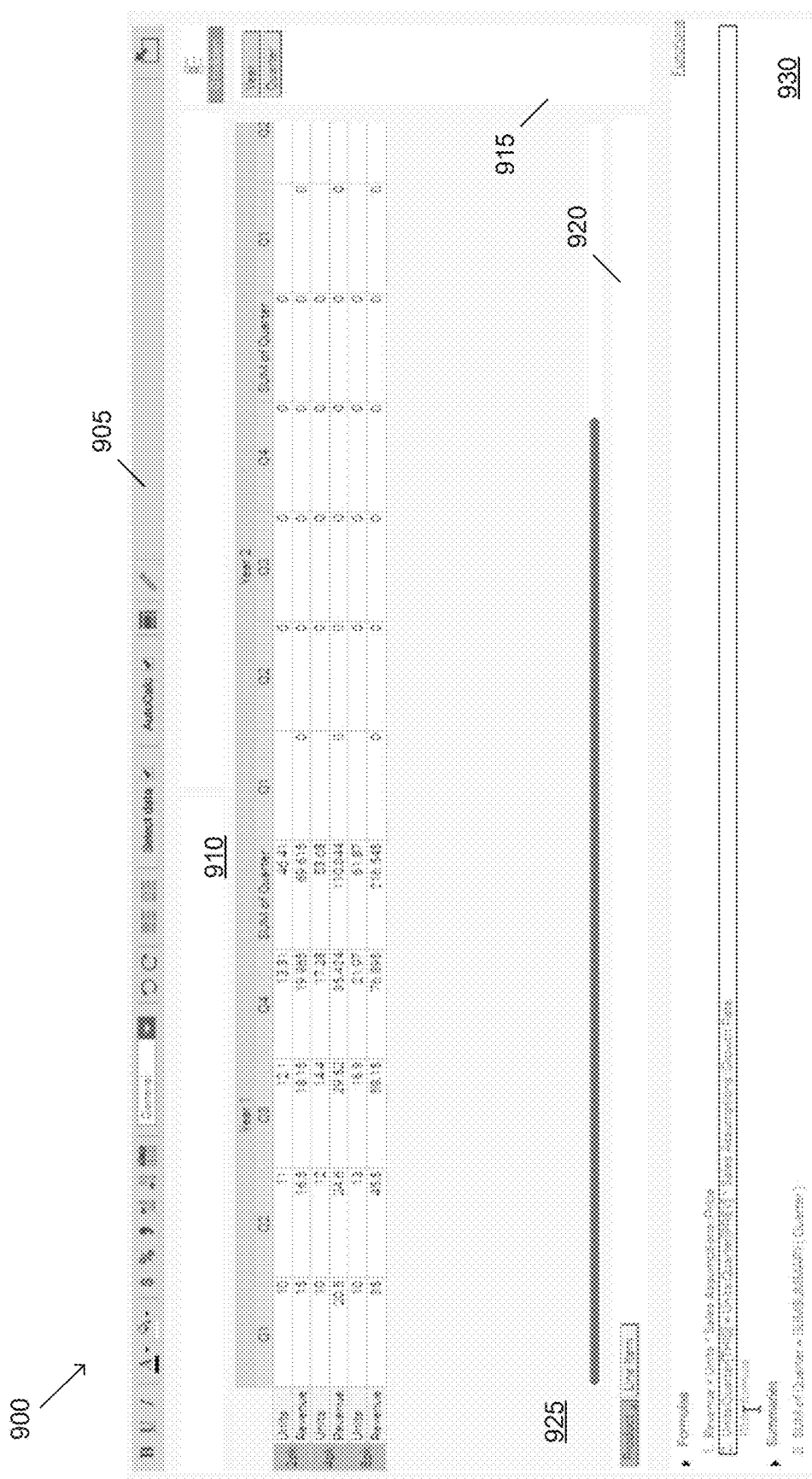
FIG. 9 illustrates an example of a data matrix graphical user interface (GUI) for a data modeling client application in accordance with an embodiment of the invention.

An example of a data matrix graphical user interface (GUI) for a data modeling client application in accordance with an embodiment of the invention is illustrated in FIG. 9. In certain embodiments, data matrix GUIs can be used for various data operations, such as (but not limited to) slicing, charting, and/or filtering. In this example, data matrix GUI 900 includes a toolbar 905, page tray 910, dimension trays 915 and 920, data display area 925, and formula area 930.

Toolbars in accordance with various embodiments of the invention can include various affordances for a variety of different functions, such as (but not limited to) saving data, refreshing data, creating new data matrices, formatting data, etc.

In a number of embodiments, page trays can be used to identify elements of one or more dimensions on which filters can be applied. The identified elements for each of the dimensions can be used to limit or filter the data that is displayed in the data display area.

Dimension trays in accordance with a variety of embodiments of the invention can be used to build a multi-dimensional model and/or to slice an existing model to provide different views of the data within the model. In this example, dimension trays 915 and 920 provide dimensions along the horizontal and vertical axes respectively. In many embodiments, the order of the dimensions within dimension trays can determine the way that the data is displayed, grouped, and/or ordered. The process of moving dimensions into the trays can be referred to as "rotating the cube" or "rotating the view" of the n-dimensional data presented to the user via the GUI.

In various embodiments, data display areas can be used to display a view of a multi-dimensional model based on the values in page trays, dimension trays, formulas, etc. Data display areas in accordance with several embodiments of the invention can be used to input data (e.g., copy/paste, manual entry, etc.).

Figure 10:
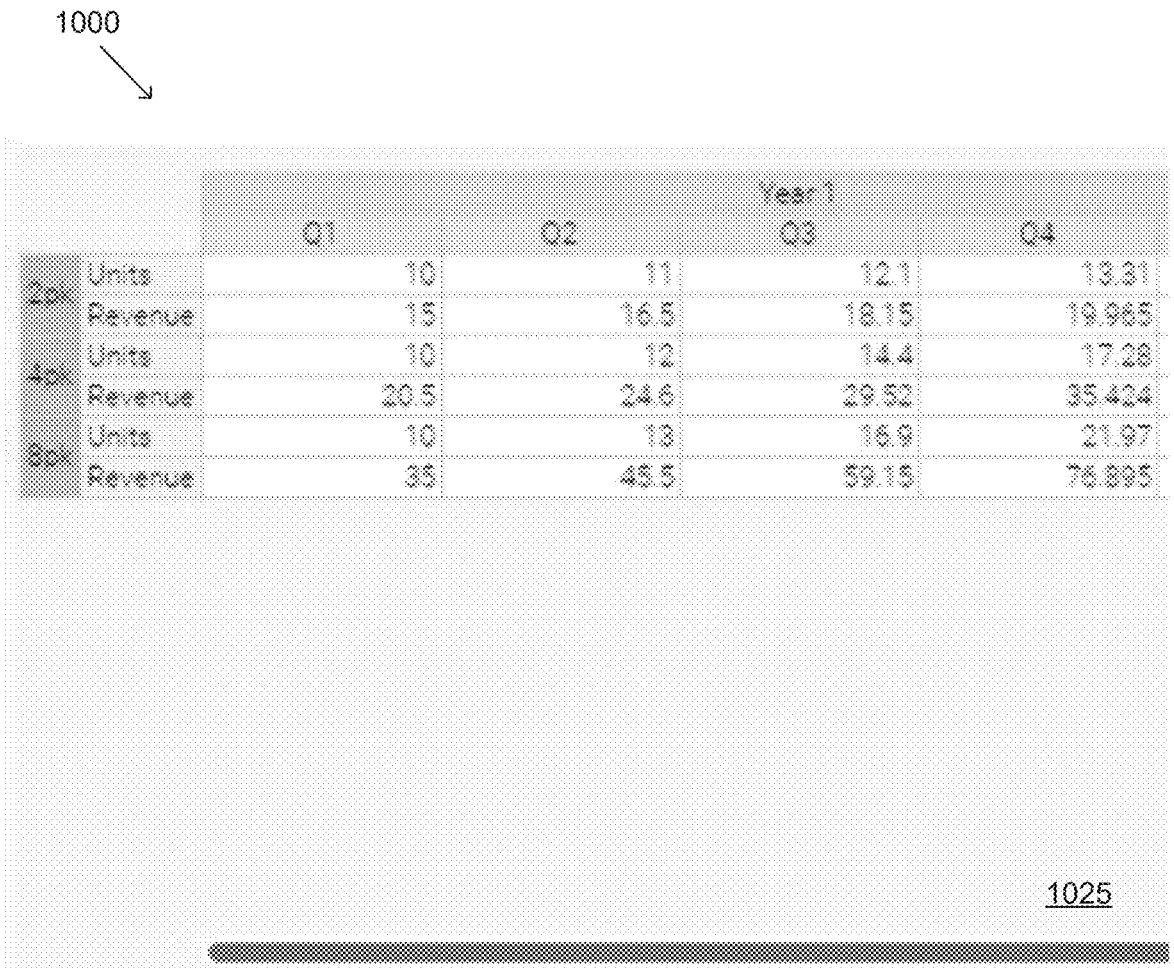
FIG. 10 illustrates an example of formulas and summaries user interface generated by a data modeling client.

Formula areas in accordance with many embodiments of the invention can be used for creating calculated fields and/or summary values. An example of a formulas and summaries user interface generated by a data modeling client is illustrated in FIG. 10. In this example, the GUI 1000 includes data display area 1025 and formula area 1030. Formula area 1030 includes a formula section 1035 and a summaries section 1040. Formula section 1035 includes formulas for revenue (Revenue=Units*Sales Assumption: Price) and units per quarter (Units: Quarter[THIS]=Units: Quarter[PREV]*Sales Assumptions: Growth Rate).

Summaries section 1040 includes a sum of the quarters for each year. Summaries in accordance with numerous embodiments of the invention can allow a user to enter a summary (e.g., sum, average, median, etc.) for data across a given dimension.

As can readily be appreciated, the ability to define formulas based upon dimensions can provide significant advantages over conventional spreadsheet applications. In a conventional spreadsheet, a formula is typically defined that performs a calculation based upon values in specifically identified cells. Therefore, the application of the same formula to multiple sets of input cells typically requires the copying of the formula, which can lead to the introduction of errors into a model when the incorrect input cells are referenced in the copied formula. Data modeling application platforms in accordance with many embodiments of the invention enable the definition of formulas as dimensions, where the formulas are defined based upon the dimensions in the n-dimensional data. In this way, the formula is defined once and applied to the identified dimensions in a manner that can be consistent across multiple users within an organization.

Data modeling application platforms in accordance with several embodiments of the invention are configured to respond to an update to a value within the n-dimensional data by determining, in real-time, regions within the n-dimensional data that are dependent upon the modified value. Rather than maintaining a dependency graph, which can require vast amounts of memory for complex models, the data modeling application platform can utilize formulas to identify regions (or cuboids) within the n-dimensional data that are dependent upon a particular value. Values within the cuboid can then be updated as appropriate based upon the initial updated value. Each additional updated value can then be treated in a similar manner as the initial updated value and additional cuboids identified until all necessary updates are performed within the n-dimensional data. An example of a process for resolving dependencies on a modified value within n-dimensional data is described in greater detail with reference to FIG. 12.

An example of a user interface with sparklines is illustrated in three stages 1105-1115 of FIG. 11. The first stage 1105 shows a data matrix interface with various dimensions in the dimension trays 1130 and 1135 to provide a view of the data in the display area 1140. In the first stage 1105, a user has selected dimension 1145. In the second stage 1110, the user has moved the selected dimension 1145 to chart tray 1150. Upon moving the selected dimension, the display area 1140 shows sparklines based on the selected dimension 1145. In numerous embodiments, sparklines can be color coded based on various factors, such as (but not limited to) trends, relative scale, etc. Such visual indicators can allow a user to quickly compare series data across a dimension. The second stage 1110 also shows that the user has selected the sparkline 1155.

In certain embodiments, sparklines can be used as UI tools for adding dimensions to a chart. In certain embodiments, processes can retrieve metadata for the selected dimension(s) to determine how to display the chart. The third stage 1115 shows that a new graph 1165 has been generated and displayed based on the selected sparkline 1155. In a variety of embodiments, when multiple sparklines are selected for display, graphs for the multiple selected series can be displayed together on a single chart. Processes in accordance with several embodiments of the invention can use metadata to determine various characteristics of a generated chart, including (but not limited to) scale, axes dimensions, color coding, chart type, etc. In numerous embodiments, multiple sparklines can be selected and charted to show the multiple dimensions on a single chart. Although this example shows that the results are displayed in a line chart 1165, various different types of charts can be displayed, such as (but not limited to) bar charts, pie graphs, waterfall charts, etc.

UI tools in accordance with various embodiments of the invention can include dynamic controls based on metadata of the displayed data. Dynamic controls in accordance with various embodiments of the invention can allow users to select and/or modify dimensions of the displayed data to show different views of the data. In a variety of embodiments, dynamic controls can include a dynamic title that describes the displayed data along one or more dimensions.

In some cases, in addition to or instead of metadata, chart generation can be based on composite items. For example, where a charted dimension includes formulas with dependencies, the UI in accordance with a variety of embodiments of the invention can include affordances that enable a user to drill down in any dimension that has dependencies in order to expand upon it.

Data Modeling Platform Processes

Dynamic Discovery of Dependency Tree

In several embodiments, processes can build a dependency tree (or graph) after each formula submission. The dependency tree can be stored and used to evaluate the formulas. In many embodiments, the dependency graph can contain the input cells for the formula, which can be used for partial calculation by determining which cells depend on a particular input cell the user has modified. However, such processes can require significant amounts of processing to build. Further, storing the tree can be burdensome, both in storage as well as when the tree is brought into random-access memory (RAM) (e.g., during calculations). In certain embodiments, dependency trees do not include the input cells, which can reduce the RAM and storage usage, but still requires the tree to be built and for the tree to be brought into RAM for calculations to be performed.

In a number of embodiments, dependency graphs can be dynamically discovered, with no need to build, store and load a dependency tree at all. An example of a process for dynamic discovery in accordance with an embodiment of the invention is conceptually illustrated in FIG. 12. Process 1200 detects (1205) a change in value for a field. Values in a field can change when a user updates a cell, when data in a data source changes, when a formula is modified, etc.

Process 1200 evaluates (1210) formulas to determine affected fields. Rather than maintaining dependencies between cells, processes in accordance with a variety of embodiments of the invention can evaluate the formulas of a model to determine whether the field with the changed value is a part of the formula. Affected fields in accordance with a number of embodiments of the invention can include fields, summaries, and/or formulas that have values that depend on the changed field.

Process 1200 updates (1215) affected fields. In some embodiments, the affected fields can be updated based on the new values for the field. In various embodiments, evaluating formulas can include determining how to distribute calculations for fields across multiple threads and/or processors, where updating affected fields can be performed in parallel across the multiple threads and/or processors. Multi-threading in accordance with a number of embodiments of the invention can be performed in various ways, such as (but not limited to) using multi-threading application programming interfaces (APIs) and/or libraries (e.g., OpenMP).

Process 1200 determines (1220) whether the update affects other fields. When the process determines that other fields are not affected, the process ends. Otherwise, the process returns to step 1210 to evaluate the formulas to determine whether there are any newly affected fields based on the update to the affected fields.

While specific processes for dynamic dependency tree discovery are described above, any of a variety of processes can be utilized to dynamically discover dependency trees as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Figure 13:
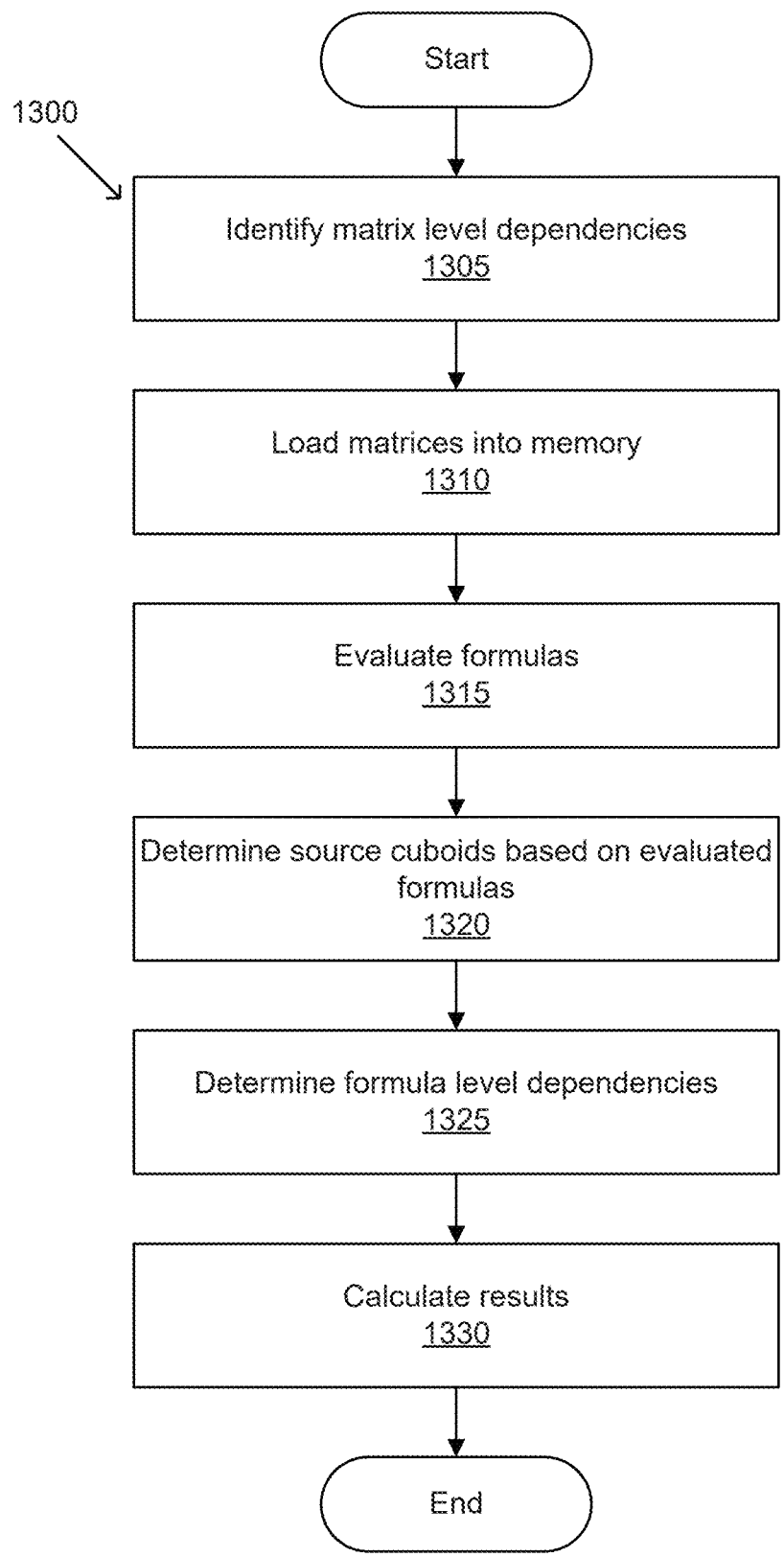
FIG. 13 illustrates an example of a process for performing a full evaluation in accordance with an embodiment of the invention.

In a variety of embodiments, processes can determine whether to perform partial evaluation (e.g., as described in process 1200) or to perform a full evaluation based on the nature of the change, the amount of data that has been affected, etc. An example of a process for performing a full evaluation in accordance with an embodiment of the invention is illustrated in FIG. 13. Process 1300 identifies (1305) matrix-level dependencies. Matrix-level dependencies in accordance with several embodiments of the invention can reflect relationships between different matrices. For example, when calculating numbers in one matrix requires numbers from another matrix, the matrices can be considered to be dependent on each other. Dependencies of matrices in accordance with a variety of embodiments of the invention can be described by a directed graph (including potentially a cyclic directed graph) in which the nodes are the matrices. Processes in accordance with a number of embodiments of the invention can build directed graphs by analyzing formulas and determining which matrices are connected. In many embodiments, a single model can contain more than one dependency graph.

Process 1300 loads (1310) matrices into memory based on the matrix-level dependencies. In a variety of embodiments, portions of matrices can be loaded as chunks as described in this specification. Process 1300 evaluates (1315) formulas for the matrices loaded into memory. In many embodiments, processes can determine result cuboids based on the evaluated formulas. Result cuboids in accordance with numerous embodiments of the invention are regions of the n-dimensional data that are dependent on the value of another source cuboid. Process 1300 determines (1320) source cuboids based on the result cuboids. Process 1300 determines (1325) formula level dependencies based on the source cuboids. Process 1300 calculates (1325) values for the formulas. Processes in accordance with some embodiments of the invention can save the calculated values to the matrices.

In many embodiments, various steps (e.g., loading chunks of matrices, evaluating formulas, determining cuboids, formula calculations, etc.) can be performed across multiple threads and/or processors, where updating affected fields can be performed in parallel across the multiple threads and/or processors. Multi-threading in accordance with a number of embodiments of the invention can be performed in various ways, such as (but not limited to) using multi-threading application programming interfaces (APIs) and/or libraries (e.g., OpenMP).

While specific processes for calculations are described above, any of a variety of processes can be utilized to propagate changes to the data as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Query Generation

When quantitative modeling in traditional spreadsheets incorporates data from a data source, the typical modeling workflow occurs in two steps. First, the data is imported through some form of OLAP/BI procedure, and is introduced into the spreadsheet environment as a batch of data (import) which has been manipulated (e.g., aggregations) through the OLAP procedure. The second step of adding user-defined logic in order to further model the data (e.g., calculate metrics not available in the source data, perform some form of estimate or forecast, etc.) is accomplished through the use of formulas. This second step in the modeling process can be inspected or audited by an author (or modeler) or others consuming the results of the model. However, manipulations during the first step are often obfuscated behind the engine/process used to extract and load data from the original source.

Systems and methods in accordance with many embodiments of the invention can provide a formula language that can allow a user to capture the logic of both the first and second step in formulas, thereby giving the modeler the ability to control, directly and dynamically, the logical flow from source data to final results. The ability to design formulas directly from the source data in accordance with various embodiments of the invention can help remove latency in the modeling process, as there is no dependency on specialized technical personnel to define and modify the initial OLAP/BI procedure, which often requires use of highly technical languages. Furthermore, the manipulation of source data and subsequent modeling of that data through formulas can be explained in human-readable language in a way which is transparent and auditable for both the author and subsequent consumers of the information.

An example of queries from query generation in accordance with an embodiment of the invention is illustrated in FIG. 14. In this example, the formula 1405 includes a COUNTSELECT function, which indicates that occurrences of the first field "samplesuperstoresalesusa::order id" are to be counted. The corresponding query function in queries 1410 and 1415 is the count( ) function. The other referenced fields "samplesuperstoresalesusa::state", "samplesuperstoresalesusa::product category", and "samplesuperstoresalesusa::order priority" indicate fields that can be filtered on and/or grouped by in the resulting queries.

Figure 15:
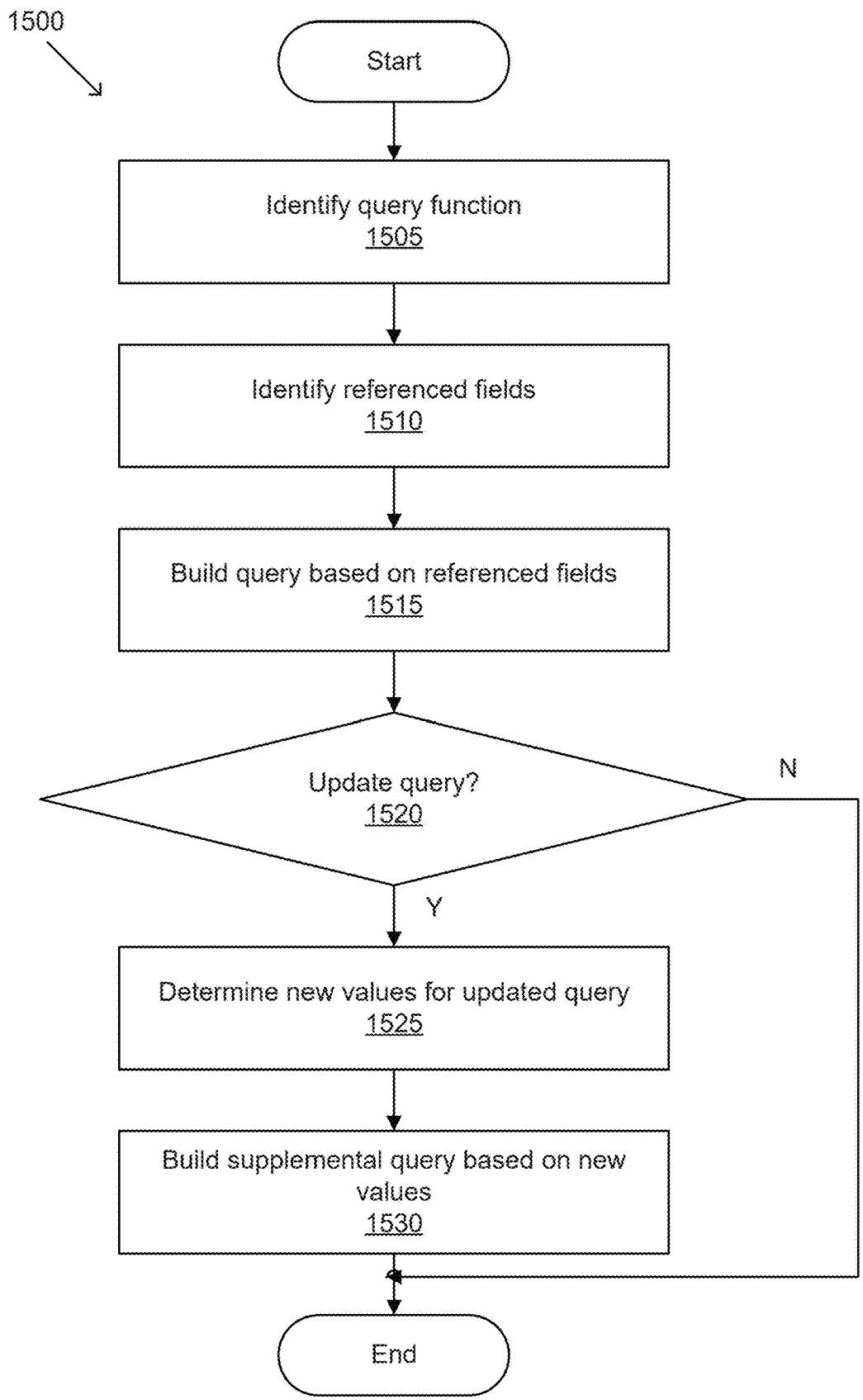
FIG. 15 conceptually illustrates an example of a process for query generation in accordance with an embodiment of the invention.

An example of a process for query generation in accordance with an embodiment of the invention is conceptually illustrated in FIG. 15. Process 1500 identifies (1505) a query function for a formula. Query functions in accordance with a number of embodiments of the invention can include various aggregate functions, such as (but not limited to) sum, count, percentile, etc. In many embodiments, query functions can be used to determine the returned value for the formula.

Process 1500 identifies (1510) referenced fields. Referenced fields in accordance with some embodiments of the invention refer to the fields referenced by the formula. In certain embodiments, referenced fields include aggregate fields (e.g., fields operated on by the query function), as well as one or more filter fields. Filter fields in accordance with several embodiments of the invention can be used to determine how the results should be filtered, sorted, and/or grouped. In various embodiments, referenced fields can include grouping fields that indicate how aggregate results should be grouped.

Process 1500 builds (1515) a query based on the referenced fields. In many embodiments, the query is built based on one or more querying languages (e.g., SQL) of underlying databases in a database layer. The referenced fields can be used to determine various elements of the query, such as (but not limited to) aggregated fields, group by fields, where clauses (or filters), etc. The WHERE and GROUP BY sections of query 1410 of FIG. 14 correspond to the referenced fields of the formula 1405. In different embodiments, WHERE clauses for unfiltered fields can be generated to include all of the available values for a given field. For example, a priority field may have three available values (e.g., Low, Medium, and High). In such an example, processes in accordance with some embodiments of the invention will still include a WHERE clause that enumerates the three available values, even though none of the values are being filtered. Such processes can allow for flexibility and responsiveness in updating the query. In several embodiments, when a field is not included in a filter, no WHERE clause is included in the query for the unfiltered field.

In various embodiments, in addition to filters determined by a query, processes in accordance with numerous embodiments of the invention can build additional filters based on various factors, such as (but not limited to) dimensional permissions, UI filters, business rules, etc. In a number of embodiments, processes can also build queries to include dynamic sub-aggregations. Sub-aggregations in accordance with a variety of embodiments of the invention can be used to provide filter box functionality and/or dimensional permissions. When a user has access to an object which includes aggregations along one or more dimensions, then the exclusion of any item in any dimension with an aggregation will dynamically generate a sub-aggregation for the remaining items that can be presented as a new item in the associated dimension. For example, when a user has filtered a view to include a subset of the data, processes in accordance with several embodiments of the invention can provide a sub-aggregation for the filtered view. In a variety of embodiments, users may choose to view or not view either of the aggregations through their filter box selection. In the case of an owner or builder making this change for a user through dimensional permissions, the owner may have the option to restrict the users access to the dynamically created sub-aggregation in accordance with several embodiments of the invention.

Process 1500 determines (1520) whether the query is to be updated. In a number of embodiments, processes can determine to update a query when a change is detected. Such changes in accordance with some embodiments of the invention can include (but are not limited to) changes in dimensional permissions, changes in the design of the model, updates to values in the model, changes in the underlying data, etc.

When the process 1500 determines (1520) that the query is not to be updated, the process ends. When the process 1500 determines that the query is to be updated, process 1500 determines (1525) new values for the updated query and builds (1530) a supplemental query based on the new values. New values in accordance with some embodiments of the invention are values that were not pulled in a previous execution of the query. In the example of FIG. 14, query 1415 is a supplemental query that is generated after data for the original generated query 1410 has been pulled in. In this example, the formula 1405 remains the same, but the states have been updated to further include Oregon and New York. Such updates can occur, for example, when a user updates the model to include additional values for a particular dimension. As illustrated in the query, the WHERE section has been updated to only draw the new values ("Oregon" and "New York"). Such processes can allow for much more efficient and responsive processing of queries against the system.

While specific processes for query generation are described above, any of a variety of processes can be utilized to generate formula queries as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Navigating Multi-Dimensional Data Vectors

In some embodiments, multi-dimensional data for a model is stored in a one-dimensional vector. The basic technique for navigating multi-dimensional data stored in a one-dimensional vector is to call a class that returns the requested values in a sequence defined by a counter which increments for every value based on the position of the preceding value relative to its position within its dimension and its position relative to the dimensions inside and outside its dimension. This method increments the inner most dimension, and then when the end of the inner most dimension is reached, the counter increments the next inner-most dimension (i.e., to the left of the preceding dimension). This counter technique, which is called/repeated for every value needed, lacks the desired performance under certain circumstances. These circumstances might be described, by ones skilled in the art, as "bottlenecks". To address these bottlenecks, a methodology was devised to identify the array of indices of the values requested as a set, and then to use this array to navigate the data vector in manner which leads to more efficient use of resources (memory and CPU) and significantly enhances performance. This methodology utilizes the mathematical concept of "finite arithmetic progressions" or FAP to efficiently build these arrays.

FAP Access Across Dimensions

Figure 16:
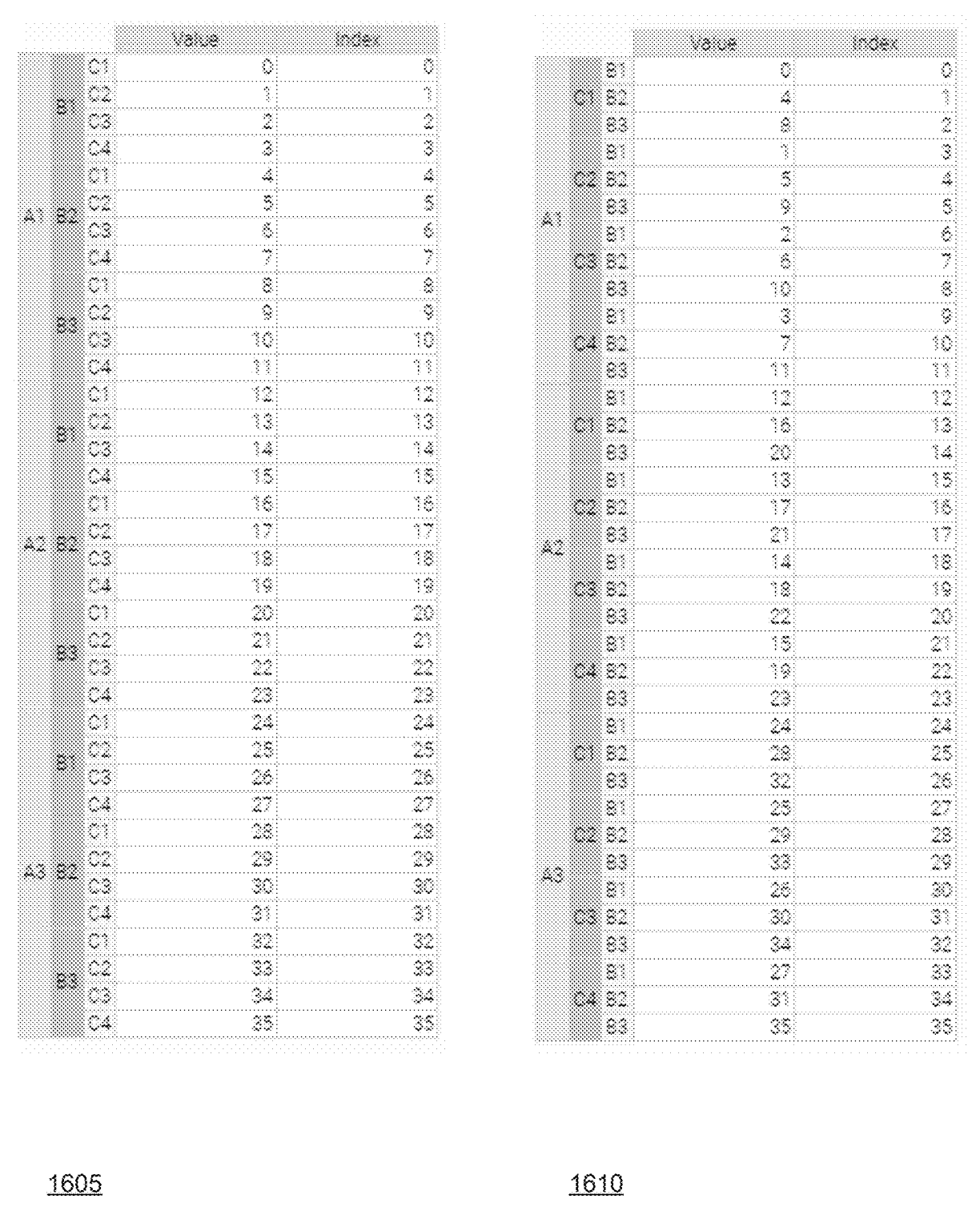

In some embodiments, multi-dimensional data for a model is stored in a one-dimensional vector. Examples of a vector representation of multi-dimensional data is illustrated in FIG. 16. In the first chart 1605, data across three dimensions (A, B, and C) is shown in a single vector in the "Value" column with values from 0-35. The indices for the values of the vector structure are shown in the "Index" column. Although the data itself is non-hierarchical and can be accessed in a non-hierarchical fashion regardless of storage, storing data in vectors in accordance with a number of embodiments of the invention can reflect a hierarchy with dimensions being "interior" to other dimensions. In this example, the values are listed with C as the innermost dimension and A as the outermost dimension. Dimensions B and C are both interior to dimension A.

In the second chart 1610, the same data is represented in a vector, where the dimensions have been reordered such that B is the innermost dimension. As can be seen in this example, the values of the elements of the vector have been reordered within the indexed vector accordingly. In a variety of embodiments, vectors that were initially stored in a given order can be re-ordered based on access to the data. For example, in the example of this figure, if the data is generally accessed to see the C values (C1-C4) for a given B value, the first ordering may be preferable, as it keeps all of the C values together, allowing for quick and efficient access of the C values for any given B. However, if queries generally access the B values for a given C value, then the order of 1610 would be preferable. Reordering of the vectors in accordance with some embodiments of the invention can be used to drive chunking decisions to store the data in a manner to optimize chunk accesses. Although these examples are illustrated with the corresponding dimensions, one skilled in the art will recognize that the vectors may be stored in various formats, with or without the associated dimension data.

Processes in accordance with some embodiments of the invention can use finite arithmetic progressions (FAPs) to access the data from vector representations of n-dimensional data. Rather than loading large data sets into memory, FAPs in accordance with certain embodiments of the invention can allow processes to quickly and efficiently access slices of the data (e.g., for calculations, to enforce permissions, etc.). In a variety of embodiments, FAPs can be computed as:

$$i = a + (k-1)*b + m$$

where a and b are constants and k and m are running variables. In this equation, k runs from 1 to $k_{max}$, while m runs from 0 to $m_{max}-1$, where $k_{max}$ is the product of outer dimensions (or 1 if the target dimension is the outermost dimension) and $m_{max}$ is the product of the inner dimensions (or 0 if the target dimension is the innermost dimension). In many embodiments, k starts at 1 and indices are computed for each m before k is incremented to k+1, upon which indices are again computed for each m.

The constants a and b can be computed as:

$$a = IF(\max(m) > 0, \max(m)*y, y)$$

$$b = IF(\max(m) > 0, \max(m)*x, x)$$

where x is the length of the target (or constrained) dimension and y is the offset of the target slice in range (0 ... x−1) in the target dimension (i.e., a zero-based index). In the example of FIG. 16, when finding elements where dimension B is constrained to B2, x=3 because the B dimension has three values (B1, B2, B3). In this example, y=1 because B2 is the second item in the B dimension, so the zero-based index is 1. $k_{max}=3$ (the size of the outer dimension A) and $m_{max}=4$ (the size of the inner dimension C), which gives us a=4*1=4 and b=4*3=12. Plugging back into the index equation above, i=4+(k−1)*12+m, for k=1 to 3 and m=0 to 3, which gives:

$$i_1 = 4 + (1-1)*12 + 0 = 4$$

$$i_2 = 4 + (1-1)*12 + 1 = 5$$

$$i_3 = 4 + (1-1)*12 + 2 = 6$$

$$i_4 = 4 + (1-1)*12 + 3 = 7$$

$$i_5 = 4 + (2-1)*12 + 0 = 16$$

$$i_1 = 4 + (3-1)*12 + 2 = 30$$

$$i_1 = 4 + (3-1)*12 + 3 = 31,$$

resulting in a set of indices: 4, 5, 6, 7, 16, 17, 18, 19, 28, 29, 30, and 31. In some embodiments, the use of a limited number of variables to compute all of the requisite indices can result in greater memory efficiency and processing.

Figure 17:
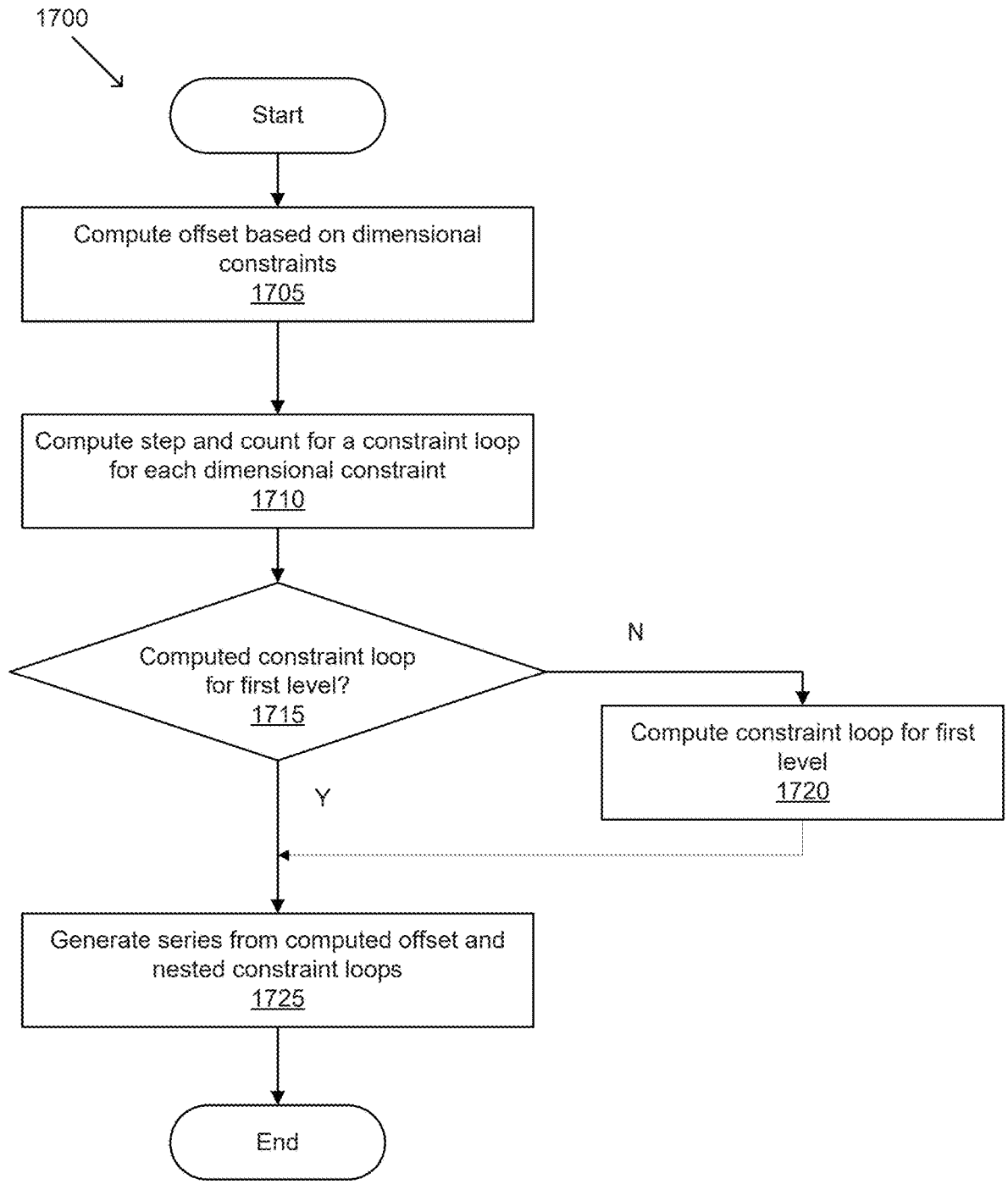
FIG. 17 conceptually illustrates an example of a process for accessing data from a one-dimensional representation of multi-dimensional data with multiple constraints in accordance with an embodiment of the invention.

An example of a process for accessing data from a one-dimensional representation of multi-dimensional data with multiple constraints in accordance with an embodiment of the invention is conceptually illustrated in FIG. 17. Process 1700 computes (1705) an offset based on constraint values. Dimensional constraints in accordance with certain embodiments of the invention are constraints for the dimensions that can be used for various purposes, such as (but not limited to) identifying slices of data, performing calculations, enforcing permissions, filtering data, etc. Computing the offset in accordance with some embodiments of the invention can be performed to determine a first element that matches the dimensional constraints in the vector.

In certain embodiments, offsets for a query can be calculated as a sum of offsets for each dimensional constraint. The offset for each dimensional constraint in accordance with various embodiments of the invention can be calculated as the product of a zero-based index into the dimension (e.g., if the dimension is constrained to the second value of the dimension, the index would be 1) and the size of each contiguous series in the vector corresponding to the dimensional constraint, where the size can be calculated as a product of the size of each interior dimension. In the example of FIG. 16, if the constraint was for the value A2, the index to the dimension in a zero-indexed vector would be 1 and the size of the series corresponding to the dimensional constraint would be the product of the sizes of the interior dimensions (i.e., 3 and 4, for dimensions B and C respectively). The offset for the constraint on dimension A would be 1*(3*4)=12, which is the first element of the A2 dimension in the vector 1605. If there were multiple constraints, the process would repeat for each constraint and the total offsets could be summed together to compute the overall offset.

Process 1700 computes (1710) a step and count for a constraint loop for each dimensional constraint. Constraint loops can produce a series of indices for a given constraint, where the count indicates the number of indices produced and the step indicates a step between the indices. For example, if the step is 3 and the count is 4, the constraint loop would produce 3, 6, 9, and 12. In certain embodiments, the step is computed as the product of the interior dimensions, including the constrained dimension, while the count can be computed as the product of the exterior dimensions, up to the next constrained dimension. In the example of FIG. 16, for a constraint on dimension B, the step would be computed as 4×3 (i.e., the size of dimensions B and C), while the count can be computed as 3 (i.e., the size of dimension A).

Process 1700 determines (1715) whether a constraint loop has been computed for the first level. In the described example, the first level (or innermost level) is dimension C. When no constraint loop has been computed for the innermost level, process 1700 computes (1720) a constraint loop for the first level. In a number of embodiments, when a constraint loop has not been calculated for the first level, the step for the first level is 1 and the count is equal to the outer loop product (up to the next constraint).

Process 1700 generates (1725) a FAP series from the computed offset and the nested constraint loops. In numerous embodiments, the computed constraint loops can then be nested to produce the final series. In this example, if the offset is 12 with an external loop with step 24 and count 2 and an internal loop with step 2 and count 3, then the generated FAP series would be 12, 14, 16, 36, 38, and 40. The series begins at 12, the internal loop produces 12, 14, and 16, the external loop then increments by 24, and the internal loop executes again to produce 36, 38, and 40.

While specific processes for generating a FAP series for vector indices are described above, any of a variety of processes can be utilized to compute indices as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Archive Snapshots

Auditable snapshots in accordance with a number of embodiments of the invention can include a read-only copy of the entire model (e.g., stored in a database), and can be accessed directly through a GUI of a data modeling client application. In a number of embodiments, saved views can be specific to an individual user. Alternatively, or conjunctively views can be saved for an organization and/or shared across a group of users. In certain embodiments, auditable snapshots take a freeze frame of the state of the models and the source data tables. Snapshots in accordance with many embodiments of the invention can freeze the view of the n-dimensional model. In many embodiments, snapshots can be archived as 2D tables (either internally or at an external database).

In a variety of embodiments, snapshots can be digitally signed files. Snapshots in accordance with some embodiments of the invention can contain 2D tables (e.g., as text files). In many embodiments, matrices in the snapshots can be represented as single-value-vector files with separate associated files with formulas for each matrix, where each linked dimension can include an extra key column which can be common across all matrices with that linked dimension. The key can be useful to disambiguate linked dimensions that have the same name. Archives in accordance with many embodiments of the invention can store a read-only copy of the entire model, which can be accessible through a data modeling interface as described in this application. In many embodiments, audit logs can be maintained to monitor edits to values in the data. Example data file structures for archiving snapshots in accordance with an embodiment of the invention are illustrated in FIG. 18. Archive snapshot 1800 includes matrices 1, 2, and 3, as well as 2D Table ("2D Table 1"). In this example, matrices 1, 2, and 3 are represented as single-value-vector files, with each row representing different data elements and each column to the left of the value vector representing different fields or dimensions. Matrix 1 also includes associated formula fields, displayed below the table, that are part of the matrix. Formula fields do not have fixed values, but can be calculated based on elements of the formula. Formulas in accordance with many embodiments of the invention can reference fields in the associated matrix and/or in other matrices. The archived snapshot also includes a 2D Table with values that indicate currency exchange rates.

While specific processes for manipulating and/or archiving n-dimensional data using a data modeling application platform are described above, any of a variety of processes can be utilized to enable multiple users to manipulate, store, and/or export n-dimensional data using a data modeling application platform as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to specific examples of data modeling application platform, the techniques disclosed herein may be used in any type of multi-user data analysis system that enables analysis of n-dimensional data, including (but not limited to) systems that serve as extension to and/or additions that provide data modeling capabilities to existing business intelligence (BI), customer relationship management (CRM), and/or enterprise resource planning (ERP) platforms. For example, in a number of embodiments, data modeling platforms can allow BI solutions to provide users with direct control over OLAP manipulation of underlying data sources and/or an analytical environment in which they can extend the BI solution (e.g., from analysis to what-if scenarios). In some embodiments, data modeling platforms can supplement data warehousing solutions (e.g., SNOWFLAKE) to provide a seamless logical interface to the underlying data.

Although specific methods of data modeling are discussed above, many different methods of modeling can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for modeling data, the method comprising:
   storing data for a set of one or more models, wherein the data for each model of the set of one or more models is:
     based on a multi-dimensional structure comprising a plurality of dimensions; and
     stored, across the plurality of dimensions, as a one-dimensional vector;
   accessing a particular subset of the data for the set of one or more models along a particular dimension of the multi-dimensional structure by:
     computing an offset for one or more constraints of the particular dimension, wherein:
       the one or more constraints is used to limit an accessed portion of the data; and
       the offset moves a first element to the particular dimension that matches each constraint of the one or more constraints;
     determining a step and a count for one or more constraint loops, wherein, for a given constraint loop of the one or more constraint loops:
       the given constraint loop has a corresponding constraint of the one or more constraints;
       the given constraint loop produces a set of indices for the corresponding constraint;
       an associated count represents a quantity for the set of indices; and
       an associated step represents a quantity of spaces between each of the set of indices; and
     generating a non-linear arithmetic progression (FAP) series to access the particular subset of the data for the set of one or more models along the particular dimension of the multi-dimensional structure, wherein the non-linear FAP series is based, at least in part, on the one or more constraint loops and the offset;
   performing calculations for the multi-dimensional structure of at least one model of the set of one or more models based on the particular subset of the data; and
   providing results of the calculations to a client application configured to display the results.

2. The method of claim 1, further comprising generating a query to retrieve the particular subset of the data from a database based on user permissions from a user management module to return a user-specific subset of data in response to a request for the data from the client application.

3. The method of claim 1, wherein:
   the one-dimensional vector is stored with metadata separators between fields of the one-dimensional vector, and
   each of the metadata separators comprise metadata related to at least one of the fields of the one-dimensional vector.

4. The method of claim 1, further comprising:
   analyzing queries for the data from a database;
   reorganizing vector data from at least one additional one-dimensional vector to optimize data access based on the queries; and
   providing portions of the vector data from the at least one additional one-dimensional vector.

5. The method of claim 1, wherein:
   the multi-dimensional structure comprises a set of one or more calculated fields, wherein each calculated field indicates a calculation involving one or more dimensions of the multi-dimensional structure;
   the multi-dimensional structure is updated based on requests for data in the multi-dimensional structure; and
   updating the multi-dimensional structure comprises determining whether to perform a full evaluation or a partial evaluation based on an expected effect of updates to the multi-dimensional structure.

6. A system for modeling data, the system comprising:
   a set of one or more servers, each server comprising:
     a set of one or more processors; and
     memory containing a data modeling platform application;
   wherein the set of one or more processors that corresponds to each server of the set of one or more servers is configured by the data modeling platform application to provide:
     a database layer configured to store data for a set of one or more models, wherein the data for each model of the set of one or more models is:
       based on a multi-dimensional structure comprising a plurality of dimensions; and
       stored, across the plurality of dimensions, as a one-dimensional vector; and
     a data modeling application layer comprising:
       a multi-dimensional data interface that provides access to the database layer, wherein the multi-dimensional data interface is configured to access a particular subset of the data for the set of one or more models along a particular dimension of the multi-dimensional structure by:
         computing an offset for one or more constraints of the particular dimension, wherein:
           the one or more constraints is used to limit an accessed portion of the data; and
           the offset moves a first element to the particular dimension that matches each constraint of the one or more constraints;
         determining a step and a count for one or more constraint loops, wherein, for a given constraint loop of the one or more constraint loops:
           the given constraint loop has a corresponding constraint of the one or more constraints;
           the given constraint loop produces a set of indices for the corresponding constraint;
           an associated count represents a quantity for the set of indices; and an associated step represents a quantity of spaces between each of the set of indices; and generating a non-linear finite arithmetic progression (FAP) series to access the particular subset of the data for the set of one or more models along the particular dimension of the multi-dimensional structure, wherein the non-linear FAP series is based, at least in part, on the one or more constraint loops and the offset; and a calculation engine configured to perform calculations across multi-dimensional structures for the set of one or more models via the multi-dimensional data interface; and a client application configured to transmit requests for the data for at least one model of the set of one or more models to the data modeling platform application.

7. The system of claim 6, wherein the data modeling platform application further comprises a chart engine configured to:

collect received data via the database layer based on the requests from the client application;

identify a plurality of dimensions associated with the received data; and generate a chart to visualize the received data along at least two of the plurality of dimensions associated with the received data.

8. The system of claim 7, wherein:

the chart engine is configured to generate a plurality of charts for a plurality of values of a given dimension of the plurality of dimensions associated with the received data to visualize the received data relative to at least one orthogonal dimension of the plurality of dimensions; and each chart is a sparkline chart that is:
associated with a set of one or more values for the particular dimension relative to items of the at least one orthogonal dimension; and
a user interface item presented in the client application, wherein selection of a particular sparkline chart displays a full-screen chart for an associated value of the plurality of values.

9. The system of claim 7, wherein the chart engine is further configured to:

display the chart at the client application; and
provide a set of user interface tools for updating the chart.

10. The system of claim 6, wherein:

the data modeling platform application further comprises a user management module, wherein the user management module communicates with the multi-dimensional data interface to return a user-specific subset of the data in response to the requests for the data; and the multi-dimensional data interface generates a query to retrieve the particular subset of the data from the database layer based on user permissions from the user management module.

11. The system of claim 10, wherein the user permissions restrict access to certain values for at least one dimension of the multi-dimensional structure.

12. The system of claim 6, wherein:

the multi-dimensional data interface is configured to provide additional access to linked dimensions located across multiple matrices; and the database layer stores each matrix as a distinct one-dimensional vector.

13. The system of claim 6, wherein:

the multi-dimensional structure comprises a set of one or more calculated fields; and each calculated field indicates a calculation involving one or more dimensions of the multi-dimensional structure.

14. The system of claim 13, wherein:

the requests for the data from the client application make changes to the data in the multi-dimensional structure; and the calculation engine is configured to update the multi-dimensional structure based on the requests.

15. The system of claim 14, wherein updating the multi-dimensional structure comprises:

determining whether to perform a full evaluation or a partial evaluation based on an expected effect of the changes to the data of the multi-dimensional structure; and performing the full evaluation or the partial evaluation accordingly.

16. The system of claim 15, wherein the partial evaluation comprises evaluating dependencies by:

determining whether a field subset of the set of one or more calculated fields is affected by the changes to the data of the multi-dimensional structure; and when the field subset is affected, updating the field subset, wherein the calculation engine is further configured to iteratively evaluate the dependencies on the field subset.

17. The system of claim 15, wherein the full evaluation comprises evaluating dependencies by:

identifying matrix-level dependencies;

loading matrices into the memory based on the matrix-level dependencies;

evaluating formulas for the matrices;

determining:
result cuboids based on the formulas;
source cuboids based on the result cuboids; and
formula-level dependencies based on the result cuboids; and calculating results for the formulas based on at least one of the result cuboids, the source cuboids, or the formula-level dependencies, wherein the results are saved to the matrices.

18. The system of claim 6, wherein:

the one-dimensional vector is stored with metadata separators between fields of the one-dimensional vector, and the metadata separators comprise metadata related to an associated field.

19. The system of claim 6, wherein the database layer is configured to:

analyze queries for the data from the database layer;

reorganize vector data from at least one additional one-dimensional vector to optimize data access based on the queries; and provide portions of the vector data from the at least one additional one-dimensional vector.

20. The system of claim 6, wherein metadata related to fields of the multi-dimensional structure is stored in a separate shadow table.

* * * * *